(12) United States Patent
Yamashita et al.

(10) Patent No.: US 7,902,778 B2
(45) Date of Patent: Mar. 8, 2011

(54) PROGRAMMABLE CONSTANT VOLTAGE RETRACT OF DISK DRIVE ACTUATOR

(75) Inventors: Masaki Yamashita, Niiza (JP); Chisako Ota, Tokyo (JP)

(73) Assignee: Texas Instruments Incorporated, Dallas, TX (US)

( * ) Notice: Subject to any disclaimer, the term of this patent is extended or adjusted under 35 U.S.C. 154(b) by 216 days.

(21) Appl. No.: 11/758,853

(22) Filed: Jun. 6, 2007

(65) Prior Publication Data

US 2007/0285827 A1 Dec. 13, 2007

Related U.S. Application Data

(60) Provisional application No. 60/804,135, filed on Jun. 7, 2006, provisional application No. 60/804,136, filed on Jun. 7, 2006.

(51) Int. Cl.
*H02P 6/18* (2006.01)
(52) U.S. Cl. .......... 318/400.34; 318/400.32; 318/400.01; 318/700; 360/75
(58) Field of Classification Search ............ 318/400.34, 318/400.32, 400.01, 700; 360/75
See application file for complete search history.

(56) References Cited

U.S. PATENT DOCUMENTS

| | | | |
|---|---|---|---|
| 5,345,347 A | 9/1994 | Hopkins et al. | |
| 6,140,784 A * | 10/2000 | Mazda | 318/280 |
| 6,188,540 B1 * | 2/2001 | Gan et al. | 360/78.04 |
| 6,316,898 B1 | 11/2001 | Albrecht et al. | |
| 6,466,391 B1 * | 10/2002 | Lee et al. | 360/75 |
| 6,560,057 B1 * | 5/2003 | Klaassen et al. | 360/75 |
| 6,765,746 B2 * | 7/2004 | Kusumoto | 360/75 |
| 6,924,956 B2 * | 8/2005 | Kurihara | 360/75 |
| 6,989,957 B2 * | 1/2006 | Hamada et al. | 360/78.04 |
| 7,027,254 B2 * | 4/2006 | Takaishi | 360/77.04 |
| 7,068,460 B2 * | 6/2006 | Brenden et al. | 360/75 |
| 7,369,346 B2 * | 5/2008 | Yamamoto | 360/75 |
| 2004/0100720 A1 * | 5/2004 | Swize | 360/75 |
| 2005/0105204 A1 | 5/2005 | Bloodworth et al. | |

OTHER PUBLICATIONS

Copending U.S. Appl. No. 11/323,800, filed Dec. 30, 2005.
Copending U.S. Appl. No. 11/758,872, filed Jun. 6, 2007.

* cited by examiner

*Primary Examiner* — Walter Benson
*Assistant Examiner* — David S Luo
(74) *Attorney, Agent, or Firm* — Dawn V. Stephens; Wade James Brady, III; Frederick J. Telecky, Jr.

(57) ABSTRACT

A disk drive system including retract logic for control of the voice coil motor in a retract operation, in which the voice coil motor positions the read/write head actuator arm in a safe place in a loss-of-power event, is disclosed. The retract logic includes circuitry for controlling the application of power to the voice coil motor from an external capacitor, so that a constant voltage is maintained across the voice coil motor. Current from the capacitor is directed to an internal variable resistor that conducts a selected current, in parallel with the current applied to the voice coil motor. The voltage developed across the variable resistor is applied to one input of a control amplifier, which receives the voltage across the voice coil motor at another input; the control amplifier in turn controls the gate of a low side transistor. The transistor passes current to the extent that the voltage across the voice coil motor corresponds to that developed across the variable resistor.

19 Claims, 9 Drawing Sheets

PROGRAMMABLE CONSTANT VOLTAGE RETRACT OF DISK DRIVE ACTUATOR

CROSS-REFERENCE TO RELATED APPLICATIONS

This application claims priority, under 35 U.S.C. §119(e), of Provisional Application No. 60/804,135, filed Jun. 7, 2006, and of Provisional Application No. 60/804,136, filed Jun. 7, 2006, both incorporated herein by this reference.

STATEMENT REGARDING FEDERALLY SPONSORED RESEARCH OR DEVELOPMENT

Not applicable.

BACKGROUND OF THE INVENTION

This invention is in the field of disk drive systems, and is more specifically directed to control of a voice coil motor in retracting the actuator in a disk drive system.

Magnetic disk drive technology is the predominant mass non-volatile storage technology in modern personal computer systems, and continues to be an important storage technology for mass storage applications in other devices, such as portable digital audio players. As is fundamental in the field of magnetic disk drives, data is written by magnetizing a location ("domain") of a layer of ferromagnetic material disposed at the surface of a disk platter. Each magnetized domain forms a magnetic dipole, with the stored data value corresponding to the orientation of that dipole. The "writing" of a data bit to a domain is typically accomplished by applying a current to a small electromagnet coil disposed physically near the magnetic disk, with the polarity of the current through the coil determining the orientation of the induced magnetic dipole, and thus the data state written to the disk. In modern disk drives, a magneto-resistive element is used to sense the orientation of the magnetic dipole at selected locations of the disk surface, thus reading the stored data state. Typically, the write coil and the magneto-resistive element are physically placed within a read/write "head".

In conventional disk drive systems, a spindle motor rotates the disk platters, and a "voice coil" motor moves an actuator arm on which the read/write heads are mounted, at a distal end from the motor. The voice coil motor thus moves the read/write heads to the track of the disk surface corresponding to the desired address. As known in the art, the read/write heads are physically very close to, but do not touch, the surface of the magnetic disks. In modern disk drives, the read/write heads are disposed within a "slider" at the distal end of a head gimbal assembly (HGA) suspension. The flexible HGA suspension is attached to the actuator arm, which as mentioned above is positioned by the voice coil motor. The relative motion between the spinning disk surface and the slider creates a lifting force on the slider, establishing an air bearing surface (ABS) on which the slider rides over the disk surface. The "fly height" of the heads over the disk surface thus results from the aerodynamics of the heads relative to the spinning disks, and is typically controlled by conducting a current through a resistor in the slider, so that thermal expansion of the heads determines the desired fly height. For maximum data density, the fly height is preferably as low as possible. On the other hand, relatively small asperities in the disk surface can cause contact between the slider and the disk surface at extremely low fly heights, such contact resulting in wear on both the slider and the disk surface and causing contamination from wear particles. In some cases, the heads may stick at locations of the disk surface where contact is made.

In conventional modern disk drive systems, the read/write heads are "parked" during such time that the disk drive is not in operation. Typically, this "parking" involves the voice coil motor positioning the actuator at a parking position at the inner or outer limit of the disk radius. Usually, the parking positions are locations of the disk surface that do not store data, and that are textured so that the heads do not stick to the disk surfaces, considering that the heads will collapse to the disk surface once the disks stop spinning. In general, as is well known in the art, the parking position of the actuator and the read/write heads, upon shutdown, includes a wedge-shaped ramp that the heads at the actuator arm contact and "climb", the top surface of which safely supports the heads at shutdown, in the absence of lift from the spinning disk platters. In addition, a "crash stop" is typically positioned past the ramp and parking position, to prevent the actuator arm from moving past the parking position, and to absorb excess kinetic energy from the actuator.

To avoid damage to the disk surface, modern disk drives typically include some provision for parking the read/write heads in the event of a sudden loss of power supply voltage. This retracting of the heads is especially important in battery-powered disk drive systems, such as disk-drive-based portable audio systems and the like. The power source for this automatic retraction of the read/write heads can be the "back emf" that is generated by the rotation of the disks themselves. Another common approach for retracting heads implements a capacitor across the voice coil motor output, which stores sufficient charge during operation to power the retraction operation upon loss of power. Conventional retract circuitry in modern disk drives control the energy applied to the voice coil motor so that the actuator has sufficient drive energy to climb the ramp at the parking position, without excess velocity that could cause the actuator to rebound from the crash stop.

FIG. 1 illustrates a conventional capacitor-based retract circuit, as implemented in voice coil motor control 210 and as applied to voice coil motor M in a conventional modern disk drive. Voice coil motor control 210 includes the necessary and appropriate conventional circuitry for driving voice coil motor M to position an attached actuator arm, such circuitry including normal drive circuitry 205, which drives motor M via lines VCMB and VCMA. Normal drive circuitry 205 thus includes conventional circuitry for receiving a torque or position signal, and output circuitry, arranged for example as an H-bridge or as a single-ended drive, to apply the appropriate current (of either polarity) to motor M. Sense resistor R_s is connected in series with motor M, such that sensing of the voltage at nodes RSENP, RSENN by feedback control circuitry (not shown) within voice coil motor control 210 can be performed.

The actuator retract function in this conventional arrangement is based on a voltage stored at capacitor 200, which is a relatively large capacitor (e.g., 220 µF), and which is therefore conventionally realized externally to voice coil motor control 10 (which itself is typically contained within an integrated circuit). The source-drain path of n-channel metal-oxide-semiconductor (MOS) transistor 206 selectively connects capacitor 200 to motor M, at node RSENP, in response to a control signal applied to the gate of transistor 206 by retract control logic 204 on line RETCTLN. Retract control logic 204 includes the appropriate conventional circuitry for determine whether the actuator is to be retracted, and for controlling the duration of the retraction event as well as the drive applied to motor M in that event.

As such, as shown in FIG. 1, retract control logic 204 issues a digital signal on lines DIG_RV_SEL to current DAC (digital-to-analog converter) 212, which controls the bias of the retraction drive applied to motor M from capacitor 200, by defining the current I_retr. Voice coil motor M is connected, at node VCMA, to the drain of n-channel MOS transistor 208, which has its source at ground and its gate controlled by low side drive amplifier 209. Low side drive amplifier 209 receives the voltage at node VCMA at a negative input, and a voltage generated by resistor R_retr at a positive input. Resistor R_etr is connected between the source of transistor 206, at node RSENP, and this positive input of low side drive amplifier 209. This voltage is also connected to current DAC 212, and to one leg of current mirror 214; current DAC 212 conducts a current selected by retract control logic 204 on lines DIG_RV_SEL. Another leg of current mirror 214 is connected through n-channel MOS transistor 215 to ground via external resistor R_bias. The gate of transistor 215 is controlled by differential amplifier 216, which receives a reference voltage from retract voltage bandgap circuit 218 at one input, and which receives the voltage at the source of transistor 215 at its other input.

In a retraction event, such as loss of power, retract control logic 204 senses the event and turns on transistor 206; normal driver circuitry 205 is disabled. Current is then conducted from capacitor 200, through transistor 206, and into motor M to apply a torque such that the connected actuator arm is moved toward the parking position. This drive is controlled by the circuitry of voice coil motor control 210, as will now be described.

According to this conventional circuit, the voltage at motor M, specifically at node RSENP, is regulated by retract control logic 204 to equal the voltage on line RETCTLN output, less the gate-to-source voltage ($V_{gs}$) of transistor 206. This regulated level, which is based on the output of voltage regulator 207, can remain relatively stable until the voltage across capacitor 200 is discharged, through transistor 206, to a voltage at the voltage on line RETCTLN; in this conventional arrangement, the voltage on line RETCTLN, as regulated by voltage regulator 207, is based on the $V_{dd}$ power supply voltage, and as such will fall as $V_{dd}$ falls in a loss of power event. During the retraction period, however, the voltage at node RSENP will remain essentially constant.

The sink current I_retr through resistor R_retr is controlled by the operation of current DAC 212, as will now be explained. The current through transistor 215 is based on the output of retract voltage bandgap circuit 218, but also on the resistance of resistor R_bias, which is reflected at the gate of transistor 215 via differential amplifier 216. This current is mirrored into current DAC 212, and in combination with the digital control signal on lines DIG_RV_SEL, is reflected in the sink current I_retr. As is evident from FIG. 1, in this conventional arrangement, the absolute level of sink current I_retr is thus determined by the resistance of external resistor R_bias. In addition, the operation of transistor 208 and low side drive amplifier 209 ensures that the voltage difference between nodes RSENP and VCMA, which is the voltage across voice coil motor M, is maintained at the level determined by the product of the resistance of resistor R_retr and the current I_retr, until the voltage at capacitor 200 falls to a level below the product of the resistance of resistor R_retr and the current I_retr. The current into voice coil motor M is thus the current sourced from capacitor 200, less this sink current I_retr.

As a result of this arrangement, in this conventional circuit, the retract reference sink current I_retr thus varies inversely with the resistance R_bias, such that the constant voltage (R_retr x I_retr) across motor M depends on the ratio of the resistance R_bias to the resistance R_retr. The voltage to be regulated across motor M is therefore determined by the relative resistance of these large external resistors R_bias, R_retr (e.g., 1.2 MΩ and 1.0 MΩ, respectively). While these resistances can be set with the desired precision, these resistances are hard-wired values. This hard-wiring of the voltage and current drive of motor M for retraction events is thus quite inflexible to the system designer and user.

By way of further background, our commonly assigned copending U.S. patent application Ser. No. 11/323,800, filed Dec. 30, 2005, entitled "Wave Torque retract of disk drive actuator", and incorporated herein by this reference, describes a control arrangement for the retraction of a disk drive actuator.

BRIEF SUMMARY OF THE INVENTION

It is therefore an object of this invention to provide a circuit for powering the retract of a disk drive actuator arm, and method of operating the same, in a controlled manner.

It is a further object of this invention to provide such a circuit and method in which a constant voltage across the voice coil motor is maintained.

It is a further object of this invention to provide such a circuit and method in which the constant voltage can be programmably controlled.

It is a further object of this invention to provide such a circuit and method in which the constant voltage control is attained without requiring external passive components to define the constant voltage level.

Other objects and advantages of this invention will be apparent to those of ordinary skill in the art having reference to the following specification together with its drawings.

The present invention may be implemented into control circuitry in the voice coil motor control function of a disk drive system, in which an on-chip variable resistor is connected in parallel with the voice coil motor, and conducts a selected and defined current. During a retract operation, energy from an external capacitor is coupled to the voice coil motor, and into the variable resistor. A low-side amplifier controls the turning on and off of a low-side transistor, which receives the current through the voice coil motor in the retract operation, in a manner regulated by the voltage across the variable resistor, so that the voltage across the voice coil motor corresponds to the voltage across the variable resistor. Constant voltage control of the retract operation is thus accomplished, in a precise manner that can be programmably selected within the voice coil motor control function.

DETAILED DESCRIPTION OF THE INVENTION

The present invention will be described in connection with its preferred embodiment, namely as implemented into a disk drive controller for a computer or other digital system, because it is contemplated that this invention will be especially beneficial when used in such an application. However, it is also contemplated that this invention may provide important benefits and advantages in other applications besides that described in this specification. Accordingly, it is to be understood that the following description is provided by way of example only, and is not intended to limit the true scope of this invention as claimed.

Figure 2:
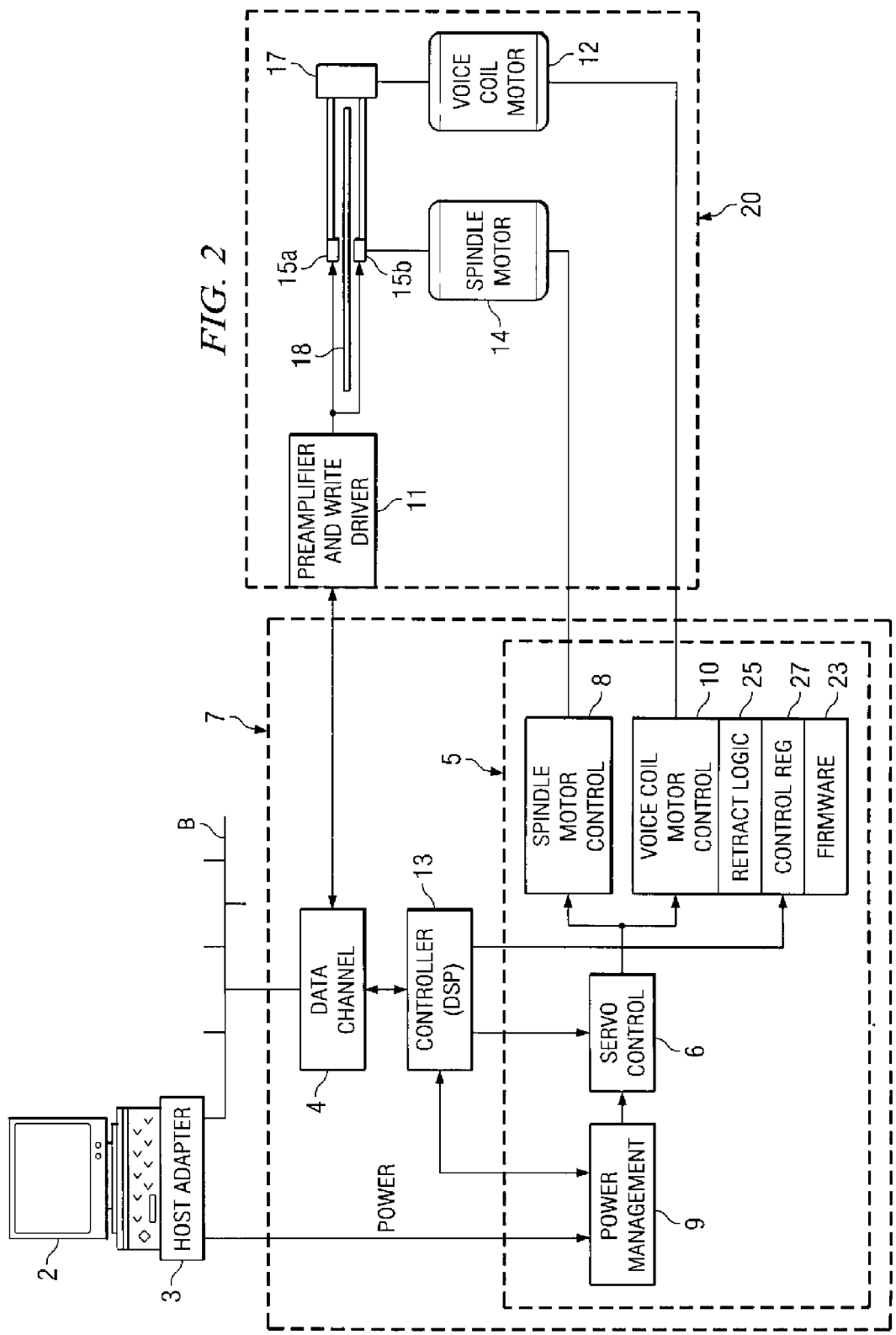
FIG. 2 is an electrical diagram, in block form, of a disk drive system constructed according to the preferred embodiment of the invention.

FIG. 2 illustrates an example of a computer including a disk drive system, into which the preferred embodiment of the invention is implemented. In this example, personal computer or workstation 2 is realized in the conventional manner, including the appropriate central processing unit (CPU), random access memory (RAM), video and sound cards or functionality, network interface capability, and the like. Also contained within computer 2 is host adapter 3, which connects on one side to the system bus of computer 2, and on the other side to bus B, to which disk drive controller 7 is connected. Bus B is preferably implemented according to conventional standards, examples of which include the Enhanced Integrated Drive Electronics (EIDE) standard or the Small Computer System Interface (SCSI) standard. Other disk storage devices (hard disk controllers, floppy drive controllers, etc.) and other peripherals may also be connected to bus B, as desired and in the conventional manner. Alternatively, system 2 may be a smaller-scale system, such as a portable digital audio player or the like.

Disk drive controller 7, in this example, corresponds to a disk drive controller architecture in which the drive electronics are physically implemented at the disk drive, rather than as a controller board within computer 2 itself. Of course, in larger scale systems, controller 7 may be implemented within computer 2. In the generalized block diagram of FIG. 1, controller 7 includes several integrated circuits, including data channel 4 in the data path between computer 2 and the medium itself. Disk drive controller 7 also includes controller 13, which is preferably implemented as a digital signal processor (DSP) or other programmable processor, along with the appropriate memory resources (not shown), which typically include some or all of read-only memory (ROM), random access memory (RAM), and other non-volatile storage such as flash memory. Controller 13 controls the operation of the disk drive system, including such functions as address mapping, error correction coding and decoding, and the like. Interface circuitry coupled between bus B and data channel 4, and other custom logic circuitry including clock generation circuits and the like also may be included within disk drive controller 7.

Head-disk assembly 20 of the disk drive system includes the electronic and mechanical components that are involved in the writing and reading of magnetically stored data. In this example, head-disk assembly 20 includes one or more disks 18 having ferromagnetic surfaces (preferably on both sides) that spin about their axis under the control of spindle motor 14. Multiple read/write head assemblies 15a, 15b are movable by actuator arm 17, and are coupled to preamplifier and write driver function 11. On the read side, preamplifier and write driver function 11 receives sensed currents from read/write head assemblies 15a, 15b in disk read operations, and amplifies and forwards signals corresponding to these sensed currents to data channel circuitry 4 in disk drive controller 7. On the write side, write driver circuitry within preamplifier and write driver function receives data to be written to a particular location of disk 18 from data channel 4, and converts these data to the appropriate signals for writing to disk 18 via read/write head assemblies 15a, 15b. Other circuit functions may also be included within the functional block labeled preamplifier and write driver function 11, including circuitry for applying a DC bias to the magnetoresistive read head in read/write head assemblies 15a, 15b, and also fly height control circuitry for controllably heating read/write head assemblies 15a, 15b to maintain a constant fly height, as described in U.S. Patent Application Publication No. US 2005/0105204 A1, published May 19, 2005 based on an application by Bloodworth et al., assigned to Texas Instruments Incorporated and incorporated herein by reference.

In this example, disk drive controller 7 includes servo control 6, which communicates with spindle motor control function 8 and voice coil motor control function 10. Spindle motor control function 8 drives spindle motor 14 in head-disk assembly 20 according to control signals from servo control 6, while voice coil motor control function 10 drives voice coil motor 12 according to such control signals. As known in the art, spindle motor 14 spins disks 18 about their axis, and voice coil motor 12 controls the radial position of actuator arm 17 at disks 18. In this manner, spindle motor 14 and voice coil motor 12 place the read/write head assemblies 15a, 15b at the desired locations of disk surface 18, according to an address value communicated by controller 13, so that the data may be written to or read from the appropriate physical location of disks 18. Power management function 9 receives power from computer 2 on line PWR as shown in FIG. 2; and includes one or more voltage regulators by way of which it generates and controls various voltages within disk drive controller 7 and also within head-disk assembly 20. The functions of servo control 6, spindle motor control 8, power management function 9, and voice coil motor control 10 may be integrated into a single integrated circuit 5, for miniaturization of the disk drive system and to reduce the manufacturing cost.

According to this embodiment of the invention, retract logic 25 is provided in connection with voice coil motor control 10, to programmably control the retract current applied to voice coil motor 12. In this embodiment of the invention, control register 27 is provided, which can be loaded with control settings from controller 13 that control the drive applied to voice coil motor 12 in retraction, as determined by the user or system designer. In addition to control register 27, firmware 23 may be provided in connection with retract logic 25 and voice coil motor control 10, for storing parameters involved in the retract function, as will be described in further detail below. These parameters stored in firmware 23 are contemplated to include trim settings for various reference voltage and reference current values involved in the retract function. In addition, default settings for various regulated voltages used in the retract operation, and also default mode selections, may also be stored in firmware 23. As known in the art, firmware 23 may be realized as a conventional flash EEPROM memory, or as another non-volatile solid-state memory resource, writable at the time of manufacture. Typically, these EEPROM bits of firmware 23 are written by automated test equipment during manufacturing test, and are not rewritable once installed in the disk drive system.

Figure 3:
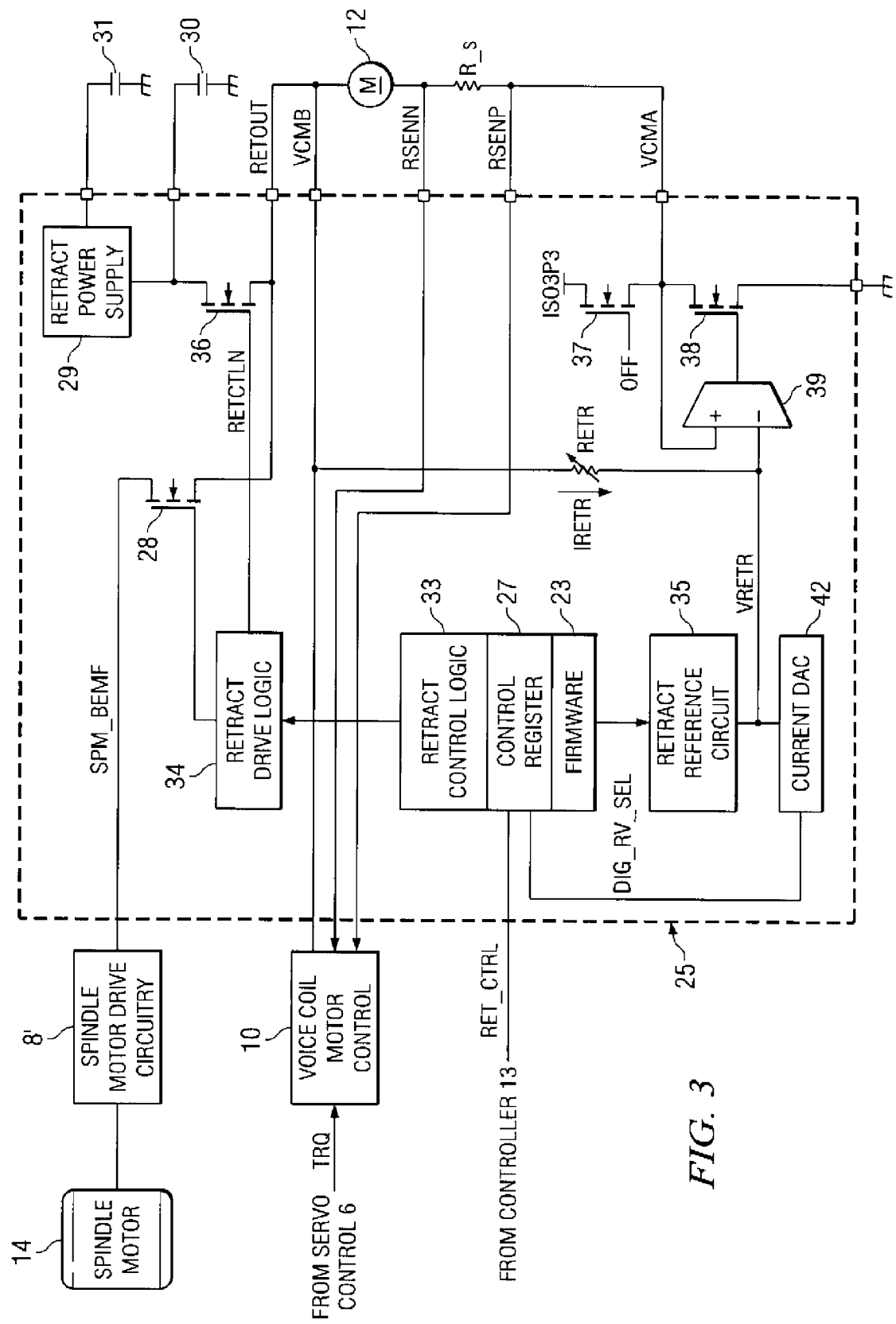
FIG. 3 is an electrical diagram, in block form, of the voice coil motor control function in the disk drive system of FIG. 2, according to the preferred embodiment of the invention.

Referring now to FIG. 3, the construction of retract logic 25 in combination with voice coil motor control 10 and voice coil motor 12 will now be described in further detail. As described above, retract logic 25 may be implemented in the same integrated circuit as voice coil motor control 10, and indeed within the same integrated circuit as spindle motor control 8 and the other functions of the disk drive system, as desired by the designer. As shown in this example, voice coil motor 12 is driven by voice coil motor control function 10 between terminals VCMB and VCMA, in series with sense resistor R_s, across which a sense voltage can be taken from terminals RSENN and RSENP. In this implementation, voice coil motor 12 is connected to terminal VCMB, with sense resistor R_s connected between voice coil motor 12 and terminal VCMA. Voice coil motor control function 10 also receives the sensed voltages at terminals RSENN, RSENP, upon which feedback control of the drive applied to voice coil motor 12 at terminal VCMB is based.

For purposes of the actuator retract function, such as in response to a loss of power or the like, retract capacitor 30 is connected externally to retract logic 25 and voice coil motor control function 10. Retract capacitor 30 is contemplated to be a relatively large capacitor, for example on the order of 220 µF, to store sufficient energy to drive voice coil motor 12 to retract the read/write heads to the safe parking position, without power from the power supply. Retract capacitor 30 is charged during the normal operation of the disk drive system, for example by a charge pump within retract power supply 29 as will be described in further detail below. In this embodiment of the invention, retract capacitor 30 is connected between system ground and an integrated circuit terminal to which the drain of n-channel MOS retract drive transistor 36 is connected. The source of retract drive transistor 36 at integrated circuit terminal RETOUT is connected to voice coil motor 12 at terminal VCMB. According to this preferred embodiment of the invention, the gate of retract drive transistor 36 can be driven by a constant voltage or in a pulse-width modulated manner by retract drive logic 34, as will be described in detail below. Retract drive logic 34 is controlled by retract control logic 33, according to this embodiment of the invention.

In this embodiment of the invention, terminal VCMA at the low side of voice coil motor 12 and sense resistor R_s is connected to the junction of the source-drain paths of transistors 37 and 38. N-channel MOS transistor 37 has its drain biased to isolation voltage ISO3P3, and its gate controlled by signal OFF that is generated by retract control logic 33, as will be described below. Transistor 38 has its source at system ground, and its gate driven by low side drive amplifier 39 as shown. The positive input of low side drive amplifier 39 receives the voltage at terminal VCMA, and the negative input of low side drive amplifier 39 receives a voltage generated by variable resistor RETR. In this example of the invention, variable resistor RETR is realized on-chip, within retract logic 25, and is variable in that its resistance value can be controlled by retract control logic 33 as will be described in detail below. Resistor RETR is connected between terminal VCMB and the negative input of low side drive amplifier 39. The voltage at this input of low side drive amplifier 39 is also connected to current DAC 42, which is a conventional digital-to-analog converter (DAC) that sinks a current from retract reference circuit 35 (described below) at a level specified by control register 27. Firmware 23 provides various parameters to retract reference circuit 35, such parameters used in trimming the reference voltages and reference currents defined by that circuit.

According to this embodiment of the invention, the "back emf" from spindle motor 14 is available as a power source for the retract operation. As shown in this example, spindle motor drive circuitry 8' (implemented within spindle motor control function 8 described above) is capable of coupling a voltage on line SPM_BEMF to the drain of transistor 28, the source of which is coupled to terminal RETOUT at the "high" side of voice coil motor 12. This transistor 28 can be the same drive transistor as used in the normal high-side drive of voice coil motor 12 in normal operation, considering that spindle motor 14 and voice coil motor 12 are preferably driven from a common power line. In a retract operation, the gate of transistor 28 is controlled by retract drive logic 34 so that, at the desired stages of the retract operation, the back emf energy from spindle motor 14 can power voice coil motor 12.

Also according to this embodiment of the invention, Vdd capacitor 31 stores sufficient energy to power retract control logic 33 and the various drive signals (e.g., the gate drive applied to transistor 36 by retract drive logic 34) in carrying out the retract function after loss of power. It is contemplated that Vdd capacitor 31 can be substantially smaller than retract capacitor 30, for example on the order of 3.3 µF (as compared with the 220 µF size of retract capacitor 30). Retract power supply 29 is connected to Vdd capacitor 31 to charge it during normal operation, and to distribute energy from it in the event of a power fault, as will now be described in connection with FIG. 4.

Figure 4:
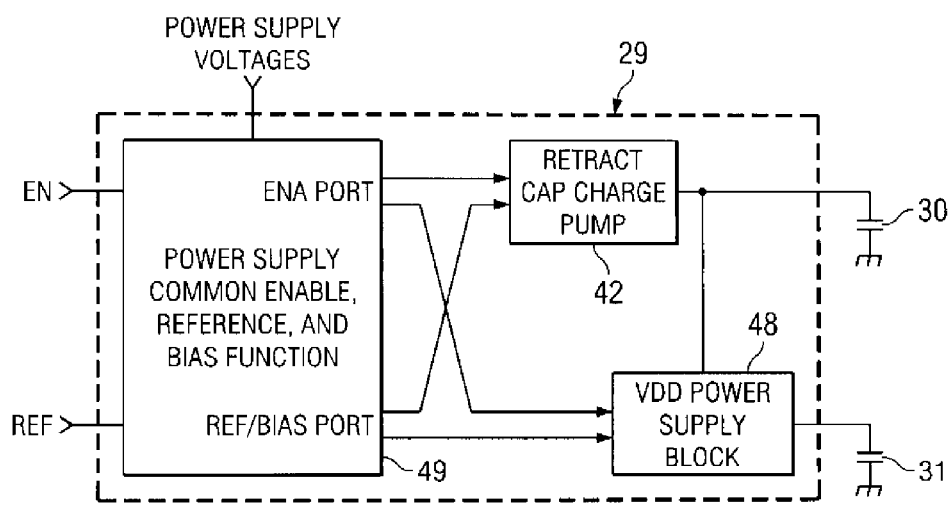
FIG. 4 is an electrical diagram, in block form, of power supply circuitry for the retract function in the voice coil motor control function of FIG. 3, according to the preferred embodiment of the invention.

As shown in FIG. 4, retract power supply 29 includes a common enable, reference, and bias function 49 that receives various enable signals EN and reference voltages REF, along with the power supply voltages that are to be monitored and that charge Vdd capacitor 31 and retract capacitor 30. In this example, common function 49 provides enable and reference and bias voltages to retract capacitor charge pump 42, which is a conventional charge pump circuit (e.g., a capacitor and diode charge pump) for charging retract capacitor 30, preferably to a voltage above that of the main power supply voltage. Similarly, Vdd power supply block 48 receives enable, reference, and bias voltages from common function 49, for charging Vdd capacitor 31. In addition, Vdd power supply block 48 can include other functions, including circuitry for detecting a loss of power supply event, and also voltage regulators. It is contemplated that retract power supply function 29 thus provides the appropriate power supply voltage and energy to retract logic 35, including to its various transistor gate drive circuits, during a retract event occurring after loss of the main power supply and the like.

Figure 5:
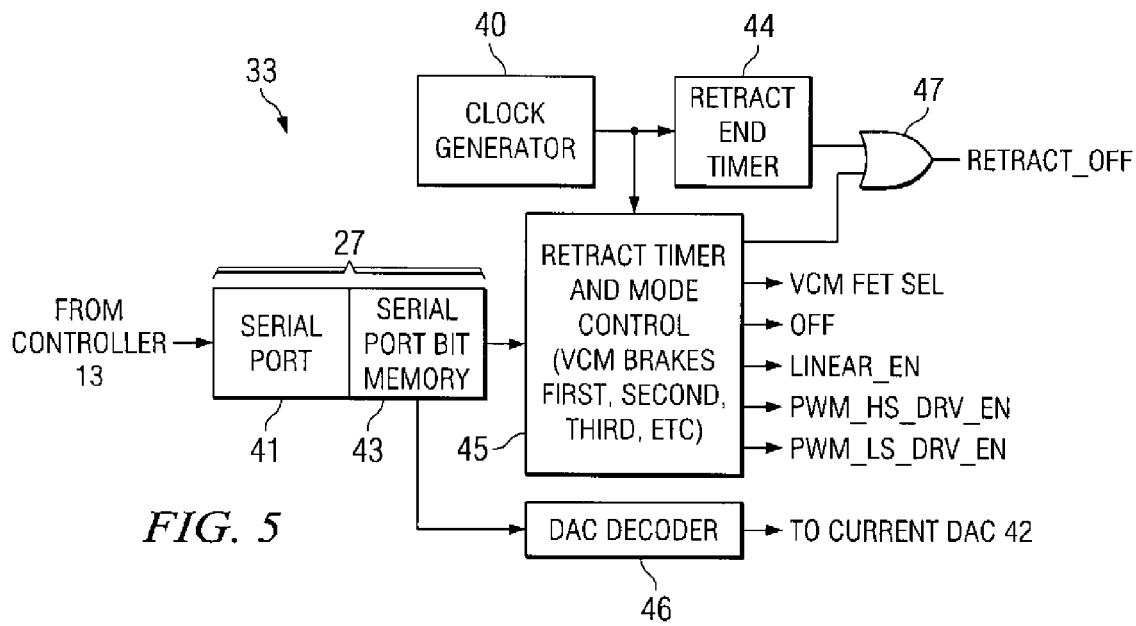
FIG. 5 is an electrical diagram, in block form, of retract control logic in the voice coil motor control function of FIG. 3, according to the preferred embodiment of the invention.

FIG. 5 illustrates, at a block diagram level, the construction of retract control logic 33 according to the preferred embodiment of the invention. Control register 27 is realized by serial port 41, which receives serial data from controller 13, and serial port bit memory 43, which stores the data received through serial port 41. According to this embodiment of the invention, the information forwarded by controller 13 through serial port 41 includes reference voltages for multiple stages of the retract operation, retract timer control bits, and also reset codes. Serial port bit memory 43 is connected to retract timer and mode control function 45, and also to DAC decoder 46. DAC decoder 46 decodes a digital value received by serial port 41 and stored in serial port bit memory 43 into a digital value that selects a current level used in the retract operation, as will be described in further detail below. Clock generator 40 generates a clock signal at a desired frequency (e.g., 4 kHz) used by retract timer and mode control function 45 to control the timing of various elements in the retract operation, as will be described below. This clock signal is also applied to retract end timer 44, which generates a pulse at its output at a selected duration from the initiation of the retract operation, which is forwarded via OR gate 47 as control signal RETRACT_OFF. Retract timer 45 and mode control function 45 is also able to end the retract operation by way of a signal applied to another input of OR gate 47.

Retract timer and mode control function 45 is control logic that controls the operation of retract logic 25 in performing the retract function. As such, retract timer and mode control function 45 may be realized as sequential logic, combinational logic, programmable logic, or a combination of such logic as selected by the designer in carrying out the functions of retract logic 25 described herein. In this regard, retract timer and mode control function 45 includes gate drive circuitry that drives such signals as signal OFF for controlling transistor 37 (FIG. 3), select signals for enabling and disabling various drive transistors within retract logic 25, such signals represented by signal lines VCM FET SEL. Furthermore according to a preferred embodiment of this invention, retract timer and mode control function 45 includes gate drive circuitry that enable pulse-width modulation (PWM) drive of voice coil motor 12 during the retract function, on line PWM_HS_DRV_EN for high-side PWM control, and on line PWM_LS_DRV_EN for low-side PWM control. Retract timer and mode control function 45 also generates a mode select signal LINEAR_EN, which controls whether the retract drive is to be "full" and driven without low side control, or "linear" in which the retract drive is controlled so that a constant voltage appears across voice coil motor 12.

According to this embodiment of the invention, the control information received at serial port 41 and stored in serial port memory 43 (or generically, in control register 27) includes the selection of various retract modes during various stages in the retract process. For example, this implementation of retract logic enables the selection of various retract modes during the various brake and retract stages. These modes include "full" retract drive or "linear" controlled retract drive of voice coil motor 12 from either retract capacitor 30 or spindle motor back emf, and a mode in which the drive from retract capacitor 30 is applied in a pulse-width-modulated (PWM) fashion. Table 1 indicates the modes available for each of the retract stages in this preferred embodiment of the invention ("X" indicating that a mode is available in a particular stage):

TABLE 1

|  | CAP 31 | | | SPM BEMF | | | |
| --- | --- | --- | --- | --- | --- | --- | --- |
|  | Linear | PWM | Full | Linear | Full | SPMBRK | VCMBRK |
| VCMBRK |  |  |  |  |  |  | X |
| 1st RET | X |  |  | X | X | X |  |
| 2nd RET | X | X | X |  |  |  |  |
| 3rd RET |  |  |  |  | X |  |  |
| 4th RET |  |  |  |  |  | X |  |

The stages of the retract operation listed in the left-hand column are in temporal order, with the first available stage being a "brake" applied to voice coil motor 12 (to preclude any transient motion), followed by up to three retract stages. The final retract stage (4$^{th}$ RET in Table 1) is a "brake" operation that stops spindle motor 14 after the actuator is safely parked. As mentioned above, controller 13 can enable any one of the available modes for a given stage, or may skip a stage completely (e.g., the 3$^{rd}$ RET stage may be skipped), if desired. The timing for the operation of these various stages is carried out by retract timer and mode control function 45.

Figure 6:
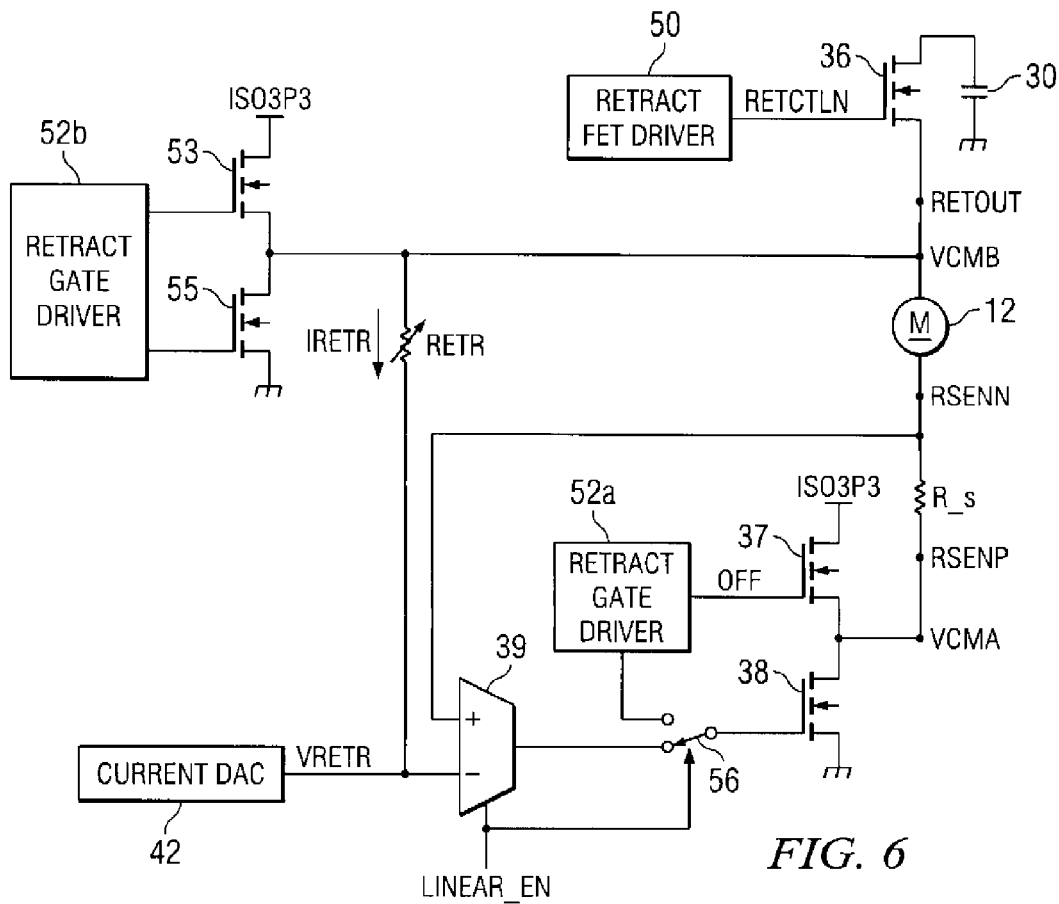
FIG. 6 is an electrical diagram, in block and schematic form, of retract power circuitry in the voice coil motor control function of FIG. 3, according to the preferred embodiment of the invention.

Referring to FIG. 6, the constant voltage control retract circuitry in retract logic 25, and its operation under the control of retract timer and mode control function 45 in the "linear" control mode, will be described in further detail. As shown in FIG. 6, this circuitry includes retract capacitor 30, which is connected via the source/drain path of retract drive transistor 36 to terminal RETOUT, and thus to voice coil motor 12 at drive terminal VCMB. The gate of retract drive transistor 36 is driven by retract FET driver 50, via line RETCTLN. As mentioned above, according to this preferred embodiment of the invention, a pulse-width-modulated retract drive may be applied to voice coil motor 12 in a different mode; this PWM control is not illustrated in FIG. 6, for the sake of clarity, but will be described in further detail below.

N-channel MOS transistors 53, 55 have their source/drain paths connected in series between power supply voltage ISO3P3 and system ground, and their gates controlled by retract gate drive function 52b, which is within retract drive logic 34, under the control of retract control logic 33. The source of transistor 53 and the drain of transistor 55 in this chain are connected to terminal VCMB, on the "high" side of voice coil motor 12 in this arrangement.

On the "low" side of this arrangement of FIG. 6, terminal VCMA is connected to the source of n-channel transistor 37, and the drain of n-channel transistor 38. Terminal RSENN, at the "low" side of voice coil motor 12, is connected to the positive input of low side amplifier 39. Transistors 37, 38 have their source/drain paths connected in series between power supply voltage ISO3P3 and system ground. The gate of transistor 37 is controlled by retract gate driver 52a, while the gate of transistor 38 is controlled by a signal selected by switch 56. Switch 56 connects the gate of transistor 38 to retract gate drive 52a in response to a control signal LINEAR_EN selecting a "full" drive mode, and connects the gate of transistor 38 to the output of low side amplifier 39 in response to control signal LINEAR_EN selecting a "linear" drive mode.

Terminal VCMB, at the "high" side of voice coil motor 12 in this arrangement, is connected to the negative input of low side amplifier 39 (at node VRETR) through variable resistor RETR. This node VRETR is also connected to and controlled by current DAC 42, in the manner described below, such that current DAC 42 conducts a defined current IRETR through resistor RETR (amplifier 42 having a high input impedance).

As such, upon detection of a loss of power fault, retract FET driver 50 turns on transistor 36. Transistors 53 and 55 will both be turned off in this case, as will be isolation transistor 37 on the low side of voice coil motor 12. As such, current is conducted into voice coil motor 12 from capacitor 30, to create torque that moves the actuator arm toward its parking position.

The goal of the linear control mode shown in FIG. 6 is to maintain a constant voltage across voice coil motor 12. This constant voltage control ensures that the velocity of the actuator, as it retracts to its parking position, is not so high as to "rebound" from the stop element at the parking position, while also ensuring that voice coil motor 12 has sufficient torque to advance the actuator over the ramp at the parking position. According to this embodiment of the invention, this control is performed by low side amplifier 39 in the low side drive of voice coil motor 12. In this example, the voltage across voice coil motor 12 is the difference between the voltage at terminal VCMB and the voltage at terminal RSENN (i.e., VCMB−RSENN). This voltage is regulated, in this embodiment of the invention, by regulating the voltage at node VRETR, considering that:

*VCMB−VRETR=VCMB−RSENN* through the operation of low side amplifier 39. According to this embodiment of the invention, the voltage across voice coil motor 12 is defined by the resistance of variable resistor RETR, and by the current through resistor RETR defined by current DAC 42. These parameters depend on retract reference circuit 35, which will now be described in connection with FIG. 7.

Figure 7:
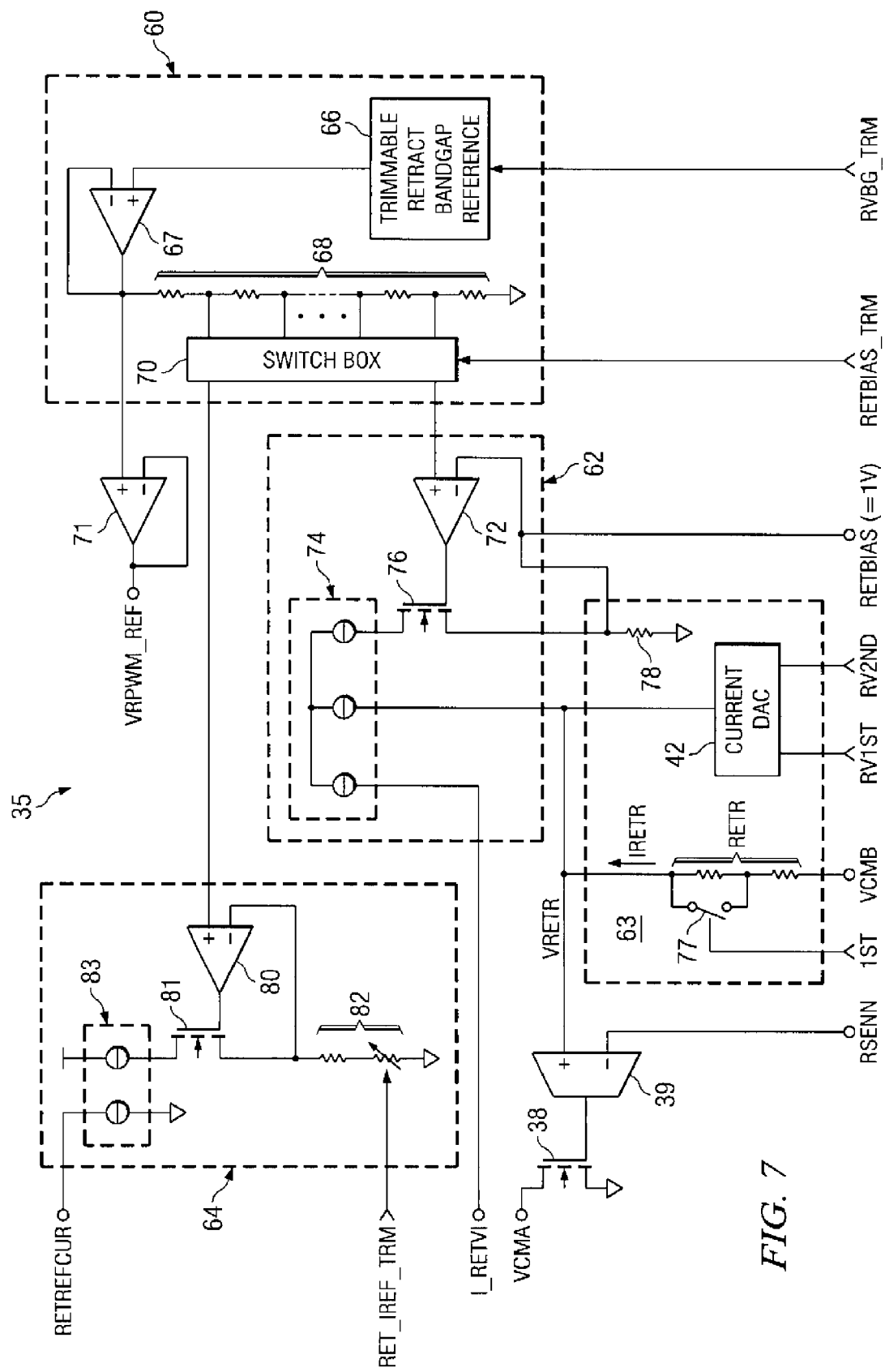
FIG. 7 is an electrical diagram, in block and schematic form, of retract reference circuitry used in linear control of the retract operation of the voice coil motor control function of FIG. 3, according to the preferred embodiment of the invention.

As shown in FIG. 7, retract reference circuit 35 includes retract voltage reference 60, retract voltage-current converter circuit 62, and retract current reference 64. Retract voltage reference 60 includes trimmable retract bandgap reference circuit 66, which produces a bandgap voltage in the conventional manner, but that is trimmable (i.e., adjustable) in response to digital trim signal RVBG_TRM stored by programmed EEPROM bits in firmware 23, or communicated from controller 13 or other control circuitry within the system. This bandgap voltage is applied to the positive input of buffer 67, which produces a stable voltage in response thereto at its output (given its negative feedback arrangement) that is applied to the top of resistor chain 68, and also to the positive input of buffer 71, which produces reference voltage VRPWM_REF at its output. Switch box 70 receives digital bias voltage trim signal RETBIAS_TRM (e.g., from firmware 23), and in response selects one or more taps of resistor chain 68 from which to select various voltages.

One such voltage is applied to the positive input of amplifier 72 in retract voltage-current converter circuit 62, while the other is forwarded to retract current reference circuit 64. Amplifier 72 has its output applied to the gate of n-channel transistor 76, which has its source/drain path connected in series between a current source in current mirror 74 and resistor 78; the other side of resistor 78 is at ground. Resistor 78 is preferably a fixed resistance, for example 1 MΩ. The voltage across resistor 78 is output as voltage RETBIAS, and is nominally at about 1.0 volts. A second leg of current mirror 74 conducts current into current DAC 42; current IRETR is also conducted from terminal VCMB through variable resistor RETR into current DAC 42. In this example, variable resistor RETR is configured as two fixed resistors (e.g., 625 kΩ each), with bypass switch 77 shorting out one of the resistors in response to a control signal on line 1ST from control logic 33, for example from retract timer and mode control function 45. For example, this switch 77 may be closed during a first portion of the retract operation, during which time the resistance of resistor RETR will be one-half of its value during a later portion of the retract operation (in which switch 77 is open). In this arrangement, current DAC 42 and variable resistor RETR, including switch 77, can be referred to as current-voltage converter 63.

As described above, the voltage developed at node VRETR is applied to a positive input of low side amplifier 39, which receives node RSENN at its negative input. The output of amplifier 39, which drives the gate of transistor 38 that is connected at its drain to terminal VCMA at the low side of voice coil motor 12, turns on transistor 38 in response to the differential voltage across these nodes.

Another leg of current mirror 74 sources a current at node I_RETV1 that is mirrored to the current conducted by transistor 76 through transistor 78. This reference current may be used in the PWM drive of voice coil motor 12, in a preferred embodiment of the invention as will be described below.

Retract current reference circuit 64 includes amplifier 80, which receives a voltage from switch box 70 in retract voltage reference circuit at one input, and which drives the gate of n-channel transistor 81 at its output. The drain of transistor 81 is connected to one leg of current mirror 83, and the source of transistor 81 is connected to variable resistor 82. Variable resistor 82 is trimmable, by signal RET_IREF_TRM from firmware 23, to trim the mirrored output current RETREFCUR that current mirror 83 sinks.

In operation, current DAC 42 (FIGS. 5 and 6), in combination with retract voltage reference 60 and retract voltage-current converter 62, controls the current IRETR. Referring to FIG. 7, trimmable bandgap reference 66, as trimmed by signal RVBG_TRM, and switch box 70, trimmed by signal RETBIAS_TRM, establish the voltage applied to the input of amplifier 72, and thus the extent to which transistor 76 conducts current. The current conducted by transistor 76 is mirrored and conducted into current DAC 42, as is current IRETR from terminal VCMB, which is conducted through resistor RETR. Current DAC 42 conducts a fixed current at a multiple of the current through transistor 76, with the multiple determined by signals RV1ST, RV2ND (for first and second stages of the retract operation, respectively, as will be described below). As such, current IRETR conducted by resistor RETR is defined by current DAC 42. This current IRETR determines the constant voltage level across voice coil motor 12 in the linear mode.

Figure 8:
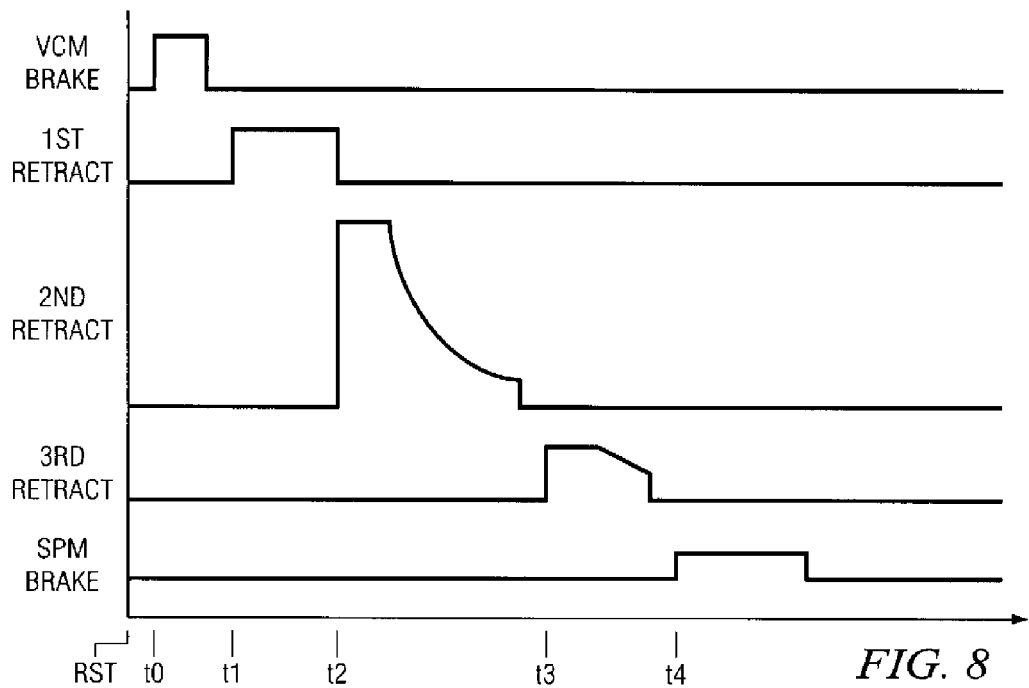
FIG. 8 is a timing diagram illustrating available stages in the operation of the actuator retract operation, according to the preferred embodiment of the invention.

FIG. 8 illustrates the operation of retract logic 25 in regulating a constant voltage across voice coil motor 12 during a retract event, for example upon loss of power supply voltage. In this example, five stages of the retract operation are shown. Each stage continues for a duration indicated by control information forwarded to control register 27 by controller 13 or other circuitry. As mentioned above, one or more of these stages of the retract operation may be omitted (e.g., by controller 13 forwarding a zero-value control word to control register 27), if desired. In this example, a reset or power-loss fault occurs at the point in time labeled RST in FIG. 8, following which a VCM "brake" bias is applied by retract logic 25 to voice coil motor 12 beginning at time t0 (the delay to time t0 corresponding to propagation delay and response time of retract logic 25, relative to the fault or reset time RST). Referring to FIG. 6, this "brake" bias preferably applies the same voltage to both sides of voice coil motor 12, for example by transistors 38 and 55 both being turned on to force a ground voltage at both sides of voice coil motor 12. The pulse illustrated in FIG. 8 shows the control signal (or gate drive applied to transistors 38 and 55) for this "brake" operation. The "brake" operation stops any current movement of the actuator, and also limits any transient torque by voice coil motor 12 that can result from the loss of power or other fault event.

At time t1, which is preferably a short delay after the end of the VCM "brake" duration (which may range from zero to twenty-eight milliseconds in this example), the first retract stage begins in this example. As described above relative to Table 1, this first retract stage may be performed in any one of several drive modes. For example, referring to FIG. 3, the back emf of spindle motor 14 may be applied to voice coil motor 12 via transistor 28, and this back emf drive can be controlled on the low side by transistor 38 in the "linear" mode, in response to control signal LINEAR_EN (FIG. 6). Alternatively, the energy source for this first retract stage may be retract capacitor 30, via transistor 36, also in the "linear" mode. Control signal LINEAR_EN may be derived by retract logic 25 itself, from a digital signal RV1ST applied to current DAC 42 (FIG. 7) as part of retract control signals RET_CTRL (FIG. 3). In this "linear" drive mode, low side amplifier 39 controls transistor 38 to maintain a constant voltage across voice coil motor 12 during the retract drive, as will be described below, with the level of current drive set by controller 13, by way of retract control signals RET_CTRL provided to control register 27. This first retract stage continues for a duration indicated by those same retract control signals RET_CTRL, and which may range from zero (stage skipped) to sixty-two milliseconds. In the example of FIG. 8, following time t1, this first retract stage is illustrated by way of the voltage across voice coil motor 12, which is substantially constant because of the linear control provided by this preferred embodiment of the invention.

At time t2 in this example of FIG. 8, the second retract stage can begin. According to this embodiment of the invention, as described above in Table 1, the back emf from spindle motor 14 is not available as an energy source to drive voice coil motor 12 in this stage; considering the relatively small size of modern disk drives, the amount of back emf energy from the rotating spindle and disks is relatively modest, and is therefore typically insufficient to complete the retract operation. Therefore, in this second retract stage, the drive of voice coil motor 12 is provided by retract capacitor 30, beginning from a voltage at or about that of the Vdd power supply voltage minus the gate-to-source voltage of transistor 36. This drive of voice coil motor 12 via transistor 36 may be controlled on the low side by transistor 38, in the "full" drive mode (i.e., transistor 38 is maintained on), or in the "linear" or constant-voltage control mode by operation of low side amplifier 39. As indicated in Table 1, retract logic 25 may also operate, in this second retract stage, in a PWM mode in which the application of energy from retract capacitor 30 is pulse-width modulated. The operation of retract logic 25 in the "linear" mode, such as is available in the first and second retract stages in this example, will be described in further detail below. This second retract stage continues for a duration ranging, for example, from one to sixteen milliseconds, as indicated in the control signals applied to control register 27. In FIG. 8, this second retract stage is illustrated, following time t2, by showing the current through voice coil motor 12 (or, proportionally, the voltage across voice coil motor 12 and sense resistor R_s); the decaying voltage across retract capacitor 30 is evident in this plot.

Following the second retract stage, a third retract stage may be performed, as shown in FIG. 8 beginning at time t3. In this third retract stage, as indicated in Table 1, the back emf of spindle motor 14 is the energy source to voice coil motor 12, with low side control in either the full or linear mode. The duration of this third retract stage is also selectable, and can range from zero (skipped) to fourteen milliseconds in this example. In this embodiment of the invention, the actuator will be parked by the end of this third retract stage. FIG. 8 illustrates this third retract stage, following time t3, as a plot of the back emf, illustrating the slow down in the rotational speed of spindle motor 14 (and thus the reduced voltage) toward the end of the period.

In this embodiment of the invention, following the third retract stage (if any), braking of spindle motor 14 may be performed by spindle-motor drive circuitry 8', in response to control signals from retract logic 25. This "brake" operation may be performed by biasing both sides of spindle motor 14 to a common voltage, slowing and eventually stopping the rotation of the spindle and disks, considering that the actuator is properly parked by the operation of the selected first through third retract stages. The duration of the spindle motor brake stage can extend from zero (skipped) to 112 msec, as indicated by the control information applied to control register 27. FIG. 8 illustrates this spindle motor brake operation by way of the control signal, or gate drive signal, used to apply this brake to the spindle.

Referring now to FIGS. 6 and 7, the operation of retract logic 25, in performing the first and second retract stages in the "linear" constant-voltage control mode using retract capacitor 30 as the power source, according to the preferred embodiment of the invention, will now be described. As indicated above relative to FIG. 8, the "linear" drive mode from retract capacitor 30 may be used in either or both of the first and second retract stages.

In this example of the operation of retract logic 25, control signal LINEAR_EN (FIG. 6) is applied to low side amplifier 39 and switch 56 so that the gate of low side transistor 38 is controlled by low side amplifier 39. In addition, transistors 37, 53, and 55 are turned off, because retract capacitor 30 is the source of the retract power in this example (spindle motor 14 back emf power would be sourced through transistor 53, as discussed above). The current applied to voice coil motor 12 is thus controlled by transistor 36, on the high side, and transistor 38, on the low side of voice coil motor 12. In the first retract stage, according to this linear control mode example, retract capacitor 30 is connected to terminal VCMB (terminal RETOUT) at the high side of voice coil motor 12 via transistor 36.

In the linear mode according to this embodiment of the invention, this current is conducted through voice coil motor 12 so long as, and to the extent that, low side amplifier 39 turns on transistor 38 (i.e., control signal LINEAR_EN is driven so that the energy applied to voice coil motor 12 is controlled by low side amplifier 39). If the voltage drop across voice coil motor 12 is less than the voltage drop across variable resistor RETR (i.e., the product of current IRETR with the resistance of variable resistor RETR), terminal RSENN will be at a higher voltage than terminal VRETR, and low side amplifier 39 will turn transistor 38 on accordingly to conduct current through voice coil motor 12. This will tend to pull node RSENN toward ground through transistor 38. As the voltage drop across voice coil motor 12 approaches the voltage drop across variable resistor RETR, the differential voltage between terminals RSENN and VRETR will reduce, reducing the drive of transistor 38 and reducing the current through voice coil motor 12. In this manner, low side amplifier 39 controls the current conducted from retract capacitor 30 through voice coil motor 12 so that the voltage drop across voice coil motor 12 remains constant, at a voltage determined by the current IRETR defined by current DAC 42, and by the resistance value of variable resistor RETR.

Preferably, as mentioned above, the retract current is controlled in stages during the retract operation. As described in Table 1, the retract operation preferably (and typically) begins with a VCM "brake" period, in which voice coil motor 12 is stopped by the application of a common voltage at its high and low sides. In addition, it is desirable to begin the actual retract operation at a reduced drive level, and thus at a reduced voltage across voice coil motor 12, relative to a later stage. As described above relative to FIG. 1, if the linear control mode is selected for the first retract stage of Table 1, switch 77 (FIG. 7) is closed, to reduce the resistance of variable resistor RETR to one-half of its full value (e.g., 625 kΩ); in this example, current DAC 42 responds to the digital control signal RV1ST to conduct a current that establishes a selected relatively low voltage (0.5 volts or less) across variable resistor RETR, and thus across voice coil motor 12, in this first retract stage in the linear control mode.

In the second retract stage in the linear control mode, switch 77 is opened so that variable resistor RETR is at its full resistance (e.g., 1.25 MΩ), and the current conducted by current DAC 42 is increased to establish a larger selected voltage drop across variable resistor RETR (e.g., up to 3.75 volts), and thus a larger voltage drop across voice coil motor 12. The voltage at terminal VCMB will approach the voltage of the Vdd power supply less the gate-to-source voltage of transistor 36 (i.e., Vdd–$V_{gs}$, as shown in FIG. 8). The operation of low side amplifier 39 in turning on transistor 38 to the extent indicated by the comparison of the voltages at terminals VRETR and RSENN will maintain a constant voltage at node RSENN, as described above, thus controlling the retract drive applied to voice coil motor 12. As shown in FIG. 8, and as described above, this drive will continue as the stored charge of retract capacitor 30 depletes.

In either stage, this constant voltage control suppresses the initial velocity of the drive applied to voice coil motor 12, thus preventing actuator rebound upon the actuator reaching a stop at its parking position, while also ensuring adequate torque so that the actuator can successfully move over the ramp at that parking position. In addition, according to this preferred embodiment of the invention, this constant voltage is established by internal components, namely variable resistor RETR within retract logic 25, with a reference current based on resistor 78 within retract voltage-current converter 62 (FIG. 7) of retract reference circuit 35. These internal components not only reduce the system manufacturing cost by eliminating two external components (e.g., resistors R_etr and R_bias of FIG. 1), but also reduce the required footprint of the disk drive controller system by eliminating the need for two pins (i.e., external terminals) that would otherwise be required to connect to these external components. In addition, this preferred embodiment of the invention provides the ability to programmably select the voltage across the internal variable resistor, and thus the regulated voltage across the voice coil motor. In this example, these voltages can be selected within different ranges for different retract stages. For example, during the first retract stage, the regulated voltage can be selected from among 0.125 volts, 0.25 volts, and 0.50 volts; in the second retract stage, this voltage can be selected to be between 0.25 volts and 3.75 volts, in steps of 0.25 volts. Accordingly, this invention provides precise and regulated control of the retract operation, at a reduced cost considering the elimination of the external components and necessary terminals or pins required to connect to those components.

As mentioned above, one of the available retract modes in the second retract stage is a pulse-width modulated (PWM) drive. According to the construction of retract logic 25 in FIG. 3, according to this preferred embodiment of the invention, PWM retract drive logic portion 34' is enabled to provide this PWM drive of the gate of transistor 36, as will now be described in further detail relative to FIG. 9. As evident from FIG. 9 in combination with FIG. 6, PWM retract drive logic portion 34' is effectively in parallel with retract FET driver 50, in driving the gate of transistor 36. It is contemplated that the appropriate switches or pass gates will be in place to selectively couple the appropriate drive circuitry (retract FET driver 50, PWM retract drive logic portion 34', etc.) to the gate of transistor 36, in response to control signals from retract timer and mode control 45 described above.

Figure 9:
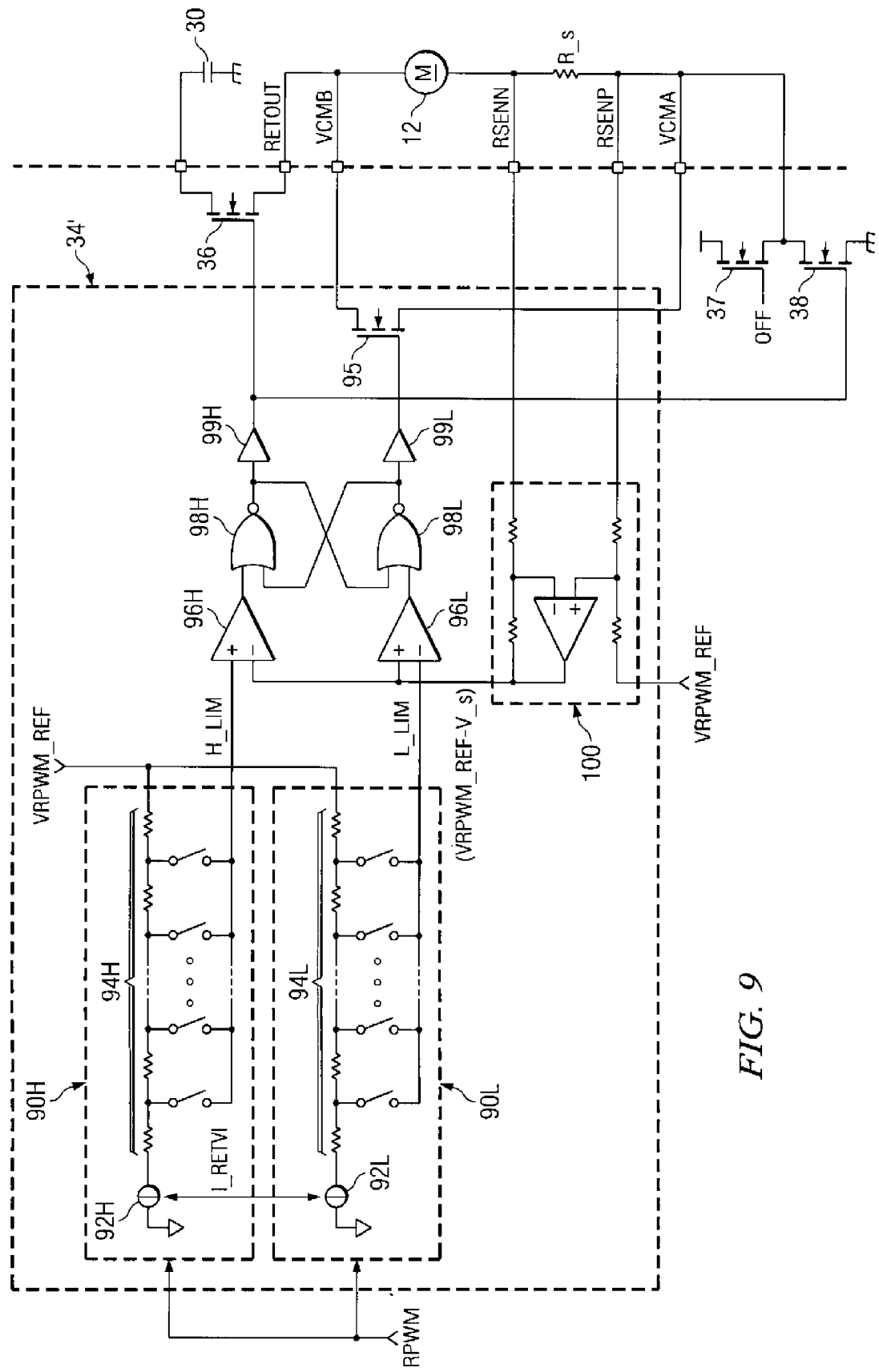
FIG. 9 is an electrical diagram, in block and schematic form, of pulse-width-modulation drive circuitry for the retract operation of the voice coil motor control function of FIG. 3, according to the preferred embodiment of the invention.

In this preferred embodiment of the invention, recirculation transistor 95 assists the retract drive of voice coil motor 12. Recirculation transistor 95 is an n-channel MOS transistor in this example, with its source/drain path connected between terminals VCMA and VCMB, across voice coil motor 12 and external sense resistor R_s. As shown in FIG. 9, external sense resistor R_s is connected on the low side of voice coil motor 12, between voice coil motor 12 and low side transistor 38. As will be described below in further detail, this placement of sense resistor R_s provides important benefits in relaxing the design constraints of the circuit, and in reducing current consumption from retract capacitor 30. The gates of recirculation transistor 95 and transistor 36 are driven by the output of a respective one of cross-coupled logic NOR gates 98H, 98L, via a corresponding buffer 99H, 99L, respectively. One input of NOR gate 98H is driven by the output of comparator 96H, and one input of NOR gate 98L is driven by the output of comparator 96L. The negative input of comparator 96H and the positive input of comparator 96L each receive an amplified signal corresponding to the voltage across resistor R_s from sense amplifier 100, which has its negative input at terminal RSENN and its positive input at terminal RSENP. Sense amplifier 100 has its positive input resistively coupled to the voltage VRPWM_REF, as generated by retract reference circuit 35, so that the output of sense amplifier 100 is generated relative to this reference voltage VRPWM_REF. By applying the common voltage VRPWM_REF at sense amplifier 100 and at resistor chains 94H, 94L, a common mode pulse-width modulated circuit is created, providing important noise rejection and isolation in its operation and that of the other retract circuits.

Resistor bridge network 90H produces reference level H_LIM, which is applied to the positive input of comparator 96H. Similarly, resistor network 90L produces reference level L_LIM, which is applied to the negative of comparator 96L. Resistor network 90H includes current source 92H, which is controlled to conduct a current mirrored from or otherwise based on reference current I_RETVI from current mirror 74 of retract voltage-current converter 62 (FIG. 7) in retract reference circuit 35. Resistor network 90L similarly includes current source 92L, which conducts the same current. This current in each of resistor networks 90H, 90L is sourced by reference voltage VRPWM_REF, which is generated by amplifier 71 in retract reference circuit 35. As such, the direction of current flow is from reference voltage VRPWM_REF through resistor networks 90H, 90L and current sources 92H, 92L, to ground. Reference level H_LIM is derived from a tap in the resistor chain 94H, and reference level L_LIM is derived from a tap in its corresponding resistor chain 94L. The particular taps of resistor chains 94H, 94L are selected in response to digital control signal RPWM, as received by control register 27. It is, of course, contemplated that the voltage of reference level H_LIM will differ from the voltage of reference level L_LIM, for example by a fixed voltage differential (e.g., 10 or 20 mV).

In the operation of second retract stage in the PWM mode, according to this preferred embodiment of the invention, transistors 36, 95 are controlled according to the level of current conducted through voice coil motor 12 external sense resistor R_s, as sensed by sense amplifier 100 across terminals RSENN, RSENP. If the current through voice coil motor 12 and thus the voltage (V_s) across resistor R_s is relatively low, the output of sense amplifier 100 will be relatively high (close to VRPWM_REF). This is because sense amplifier 100 is connected to amplify the negative voltage across resistor R_s into a differential voltage below reference voltage VRPWM_REF. In this example, considering the polarity and bias of sense amplifier 100, the lower reference level L_LIM will be relatively close to reference voltage VRPWM_REF, and the higher reference level H_LIM will be lower in voltage than lower reference level L_LIM. If this output voltage is closer to reference voltage VRPWM_REF than lower reference level L_LIM, the output of comparator 96L will be at a logic high level, while the output of comparator 96H will be at a logic low. This will force a logic low level at the output of NOR gate 98L, turning off recirculation transistor 95. However, because both the output of comparator 96H and the output of NOR gate 98L are low, the output of NOR gate 98H will be at a logic high level, which will turn on transistor 36 via buffer 99H. Current will then be sourced from retract capacitor 30 into voice coil motor 12, which will of course produce torque to move the actuator arm. This current is conducted through transistor 38 on the low side of voice coil motor 12, the gate of which is controlled by NOR gate 98H via buffer 99H in this PWM operating mode.

As the current through voice coil motor 12 increases, the voltage across resistor R_s will also increase. This will soon generate a sufficient differential voltage below reference voltage VRPWM_REF that comparator 96L will change state to then drive a logic low level. However, the logic high level at the output of NOR gate 98H will remain in place, because the change in state of comparator 96L does not affect the output of NOR gate 98L (this output being forced low because of the existing high level output at the output of NOR gate 98H). Transistor 36 remains on and transistor 95 remains off, and current continues to be sourced from retract capacitor 30 into voice coil motor 12 through transistor 38.

The current through voice coil motor 12 will continue to increase, to the point at which the voltage across resistor R_s generates a sufficiently large differential voltage below reference voltage VRPWM_REF, at the output of sense amplifier 100, that comparator 96H changes state and drives a logic level high at its output. This produces a low logic level at the output of NOR gate 98H, turning off transistor 36. However, because the comparator 96L remains at a low logic level, the low logic level at the output of NOR gate 98H causes a high logic level at the output of NOR gate 98H, turning on recirculation transistor 95. In this event, the current that was previously being conducted through voice coil motor 12 (and which, because voice coil motor 12 has a large inductance, cannot change instantaneously) will recirculate from terminal VCMA back through transistor 95 to terminal VCMB. In this manner, even though transistor 36 is off at this point, the current through voice coil motor 12 will recirculate in the same direction, and thus continue the retract operation even though capacitor 30 is disconnected. The process then repeats, with transistor 36 turning on (and transistor 95 turning off) at such time as the voltage across resistor R_s decays to a sufficiently low level to change the output state of comparator 96L.

Figure 10:
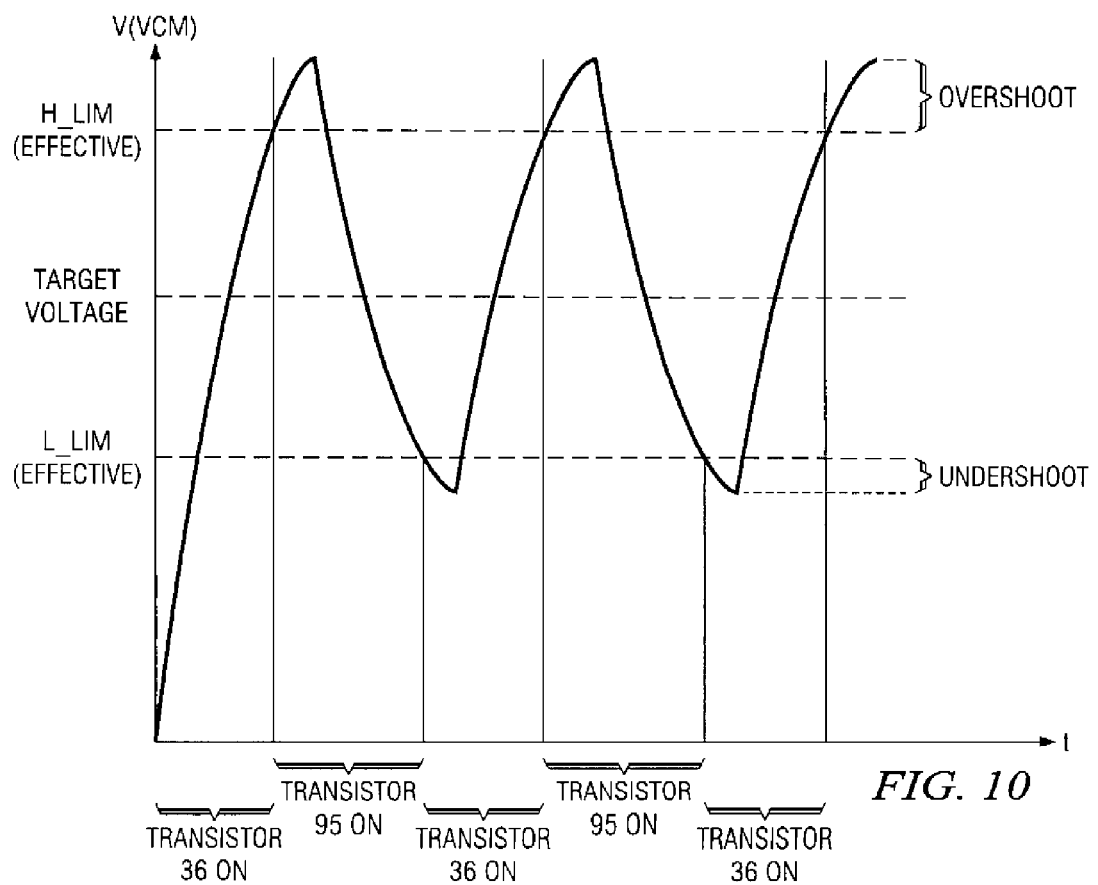
FIG. 10 is a timing diagram illustrating the operation of the pulse-width modulation drive circuitry of FIG. 9, according to the preferred embodiment of the invention.

FIG. 10 illustrates the behavior of the retract voltage V(VCM) at the output of sense amplifier 100, in the PWM operating mode according to this preferred embodiment of the invention. In this FIG. 10, the lower reference level L_LIM and the higher reference level H_LIM are illustrated as "effective" levels, with higher reference level H_LIM at a higher voltage relative to lower reference level L_LIM; of course, in the above description relative to FIG. 9, these reference levels are implemented as levels below reference voltage VRPWM_REF, considering the polarity of sense amplifier 100 and the polarity of the logic devices. In this example, voltage V(VCM) begins rising from a low level as the retract operation begins in this stage. During this charging period, transistors 36 and 38 are on (and recirculation transistor 95 is off), and the current through voice coil motor 12 and sense resistor R_s increases from a very low level, from a point in which the retract voltage V(VCM) is well below lower reference level L_LIM. Upon the voltage at the output of sense amplifier 100 (corresponding to the sensed voltage V_s) exceeding the upper reference level H_LIM, as described above, transistor 36 turns off, and recirculation transistor 95 turns on. After some overshoot of the voltage V(VCM) at sense amplifier 100 as shown in FIG. 10, the current through voice coil motor 12 begins to fall, as the recirculating current through voice coil motor 12, sense resistor R_s, and transistor 95 decays. Upon the voltage from sense amplifier 100 based on the sensed voltage V_s falling below the lower limit L_LIM, recirculation transistor 95 is turned off, and transistor 36 turns on again (transistor 38 remaining on), to source current from retract capacitor 30 into voice coil motor 12 and sense resistor R_s.

This pulsed operation of this retract stage (e.g., the second retract stage, as discussed above) continues for a duration that is indicated in the control information applied to control register 27. As discussed above relative to FIG. 8, it is contemplated that the voltage across retract capacitor 30 will decay in this stage, given its duration and the large amount of energy sourced to voice coil motor 12 in this process. During this PWM operation of this retract stage, the frequency of the PWM operation will depend on the voltage difference between the lower and higher reference levels L_LIM and H_LIM, respectively. The target center voltage (shown in FIG. 10) will, of course, be between these lower and higher reference levels L_LIM and H_LIM. Each of these levels can be programmed by a digital control word provided by controller 13, or stored as "firmware" within non-volatile memory.

According to this preferred embodiment of the invention, recirculation transistor 95 permits the implementation of both it and transistor 36 at a reduced size, relative to conventional PWM drive transistors for actuator retract, because of the extended time during which the PWM current is conducted through voice coil motor 12. For example, it is contemplated that both transistor 36 and recirculation transistor 95 can be constructed to have one-half the size (i.e., channel width/length ratio) of low-side transistor 38, and thus has one-half of its gate capacitance. Referring back to FIG. 6, a conventional approach to PWM drive of the retract operation would also include transistor 55, which would be involved in PWM switching in the "off" portions of the duty cycle, along with transistor 38; it is contemplated that transistor 95 would also be one-half the size of this transistor 55. Because the gate capacitance of transistor 95 is one-half that of transistor 55, the power consumed by the switching of transistors 36 and 95 is thus one-half that of the conventional PWM drive. This reduction in switching power is especially important in the retract operation considering that gate drive power is itself sourced by Vdd capacitor 31.

As mentioned above, and as shown in FIG. 9, sense amplifier 100 is connected across sense resistor R_s, which is on the "low" side of voice coil motor 12, opposite the "high" side to which transistor 36 couples retract capacitor 30. In conventional PWM retract circuit arrangements, this sense resistor R_s is in series with voice coil motor 12 but is placed on its "high" side. The PWM architecture of FIG. 9, according to this preferred embodiment of the invention, enables this low side sense resistor connection. As described above, low side transistor 38 is turned on during the PWM retract operation of this embodiment of the invention, thus connecting sense resistor R_s to ground. As a result, the voltage across sense resistor R_s is therefore relatively small throughout this PWM operation, and as such the common mode voltage at nodes RSENN, RSENP, which are sensed by sense amplifier 100, is quite stable, much more stable than is the case in the conventional circuit, in which sense resistor R_s is placed on the high side of voice coil motor 12. The stability of the common mode voltage relaxes the design constraints of sense amplifier 100; the common mode rejection ratio performance of this amplifier can be kept modest because the expected common mode voltage excursions are very small, and thus the current consumption of sense amplifier 100 can remain modest. This permits the PWM retraction circuitry to be implemented in relatively small chip area, and consuming relatively low power as mentioned above.

Figure 11:
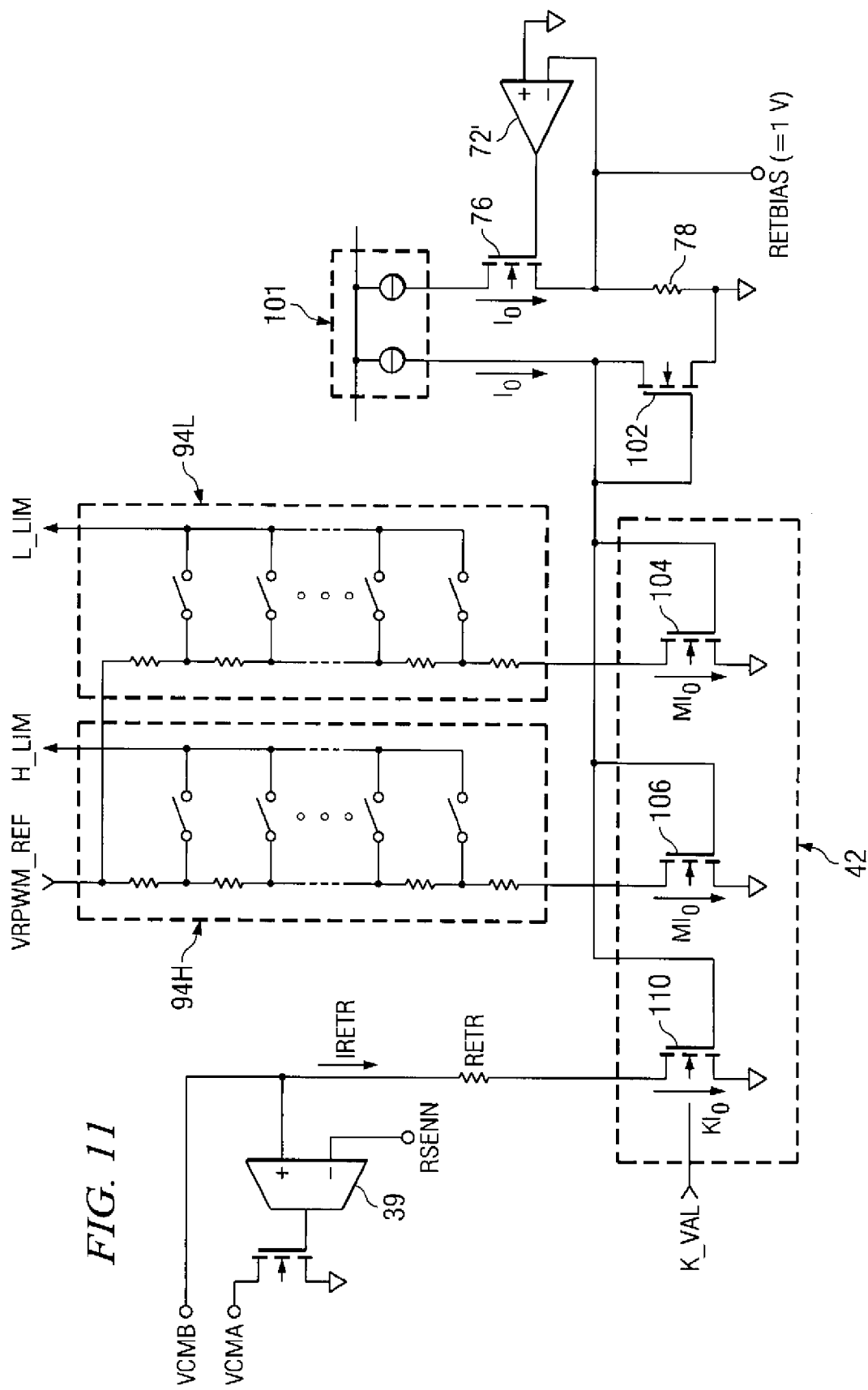
FIG. 11 is an electrical diagram, in block and schematic form, of an alternative implementation of retract reference circuitry in the voice coil motor control function of FIG. 3, according to the preferred embodiment of the invention.

According to this preferred embodiment of the invention, in which PWM retract drive logic portion 34' is implemented, retract reference circuit 35 may be constructed to utilize resistor chains 94H, 94L to establish the current levels conducted by current DAC 42, for use in the constant voltage control mode described above relative to FIGS. 6 through 8. This alternative implementation will now be described relative to FIG. 11.

In this alternative implementation, amplifier 72' has its positive input at ground, and its negative input connected to the node between resistor 78 and the source of transistor 76, which has its drain connected to the Vdd power supply via one leg of current mirror 101. The gate of transistor 76 is controlled by the output of amplifier 72'. The voltage across resistor 78, which is fed back to amplifier 72', is a trimmable reference voltage RETBIAS, as before; at the desired level of reference voltage RETBIAS, current $I_0$ is conducted by transistor 76 and, through the operation of current mirror 101, is also conducted through transistor 102, which has its gate and drain connected together at a node that is forwarded to transistors in current DAC 42' as will now be described.

In this embodiment of the invention, current DAC 42' serves as the current source for resistor chains 94H, 94L, which set the high and low limits H_LIM, L_LIM, respectively, for the PWM mode of operation. This saves additional cost in the manufacture of retract logic 35, especially considering the chip area required for resistor strings; in addition, as will be described below, the close matching that can be attained from the integration of these elements provides accurate establishment of the voltages and currents used in the retract operation, and thus a high degree of precision in the retract operation and its control.

In this example, current DAC 42' includes three current-mirror transistors 104, 106, 110, each of which has its gate connected to the gate and drain of transistor 102, and thus each of which mirrors the current conducted by transistor 102. Transistors 104 and 106 are preferably sized identically to one another, of a size that is a multiple M (in channel width/length ratio, for this MOS implementation) of the size of transistor 102. As such, each of transistors 104, 106 conduct the same current $MI_0$, where M is the size multiple of transistors 104, 106 relative to transistor 102, and where $I_0$ is the current conducted by transistor 102, as determined by the reference circuit of amplifier 72' and transistor 76. Transistor 104 serves as current source 92L (FIG. 9) for resistor chain 94L, and as such conducts this current $MI_0$ from voltage VRPWM_REF through the resistors of resistor chain 94L to ground. Similarly, transistor 102 serves as current source 92H for resistor chain 94H, conducting current $MI_0$ from voltage VRPWM_REF through the resistors of resistor chain 94H to ground. This arrangement not only shares resistors and devices between the PWM and linear control functions of retract logic 35, but also ensures that a stable and regulated current is conducted by resistor chains 94H, 94L, so that the target voltage and low and high limit voltages L_LIM, H_LIM used in the PWM retract drive are regulated and stable.

The accuracy in these PWM control voltages is especially precise considering that the resistors of resistor chains 94H, 94L are well matched with one another, and with resistor 78, because all of these resistors are formed in the same integrated circuit, and are preferably formed of the same material and the same size (i.e., cross-sectional area of the resistive conductor, with length of the conductor varying for varying resistor sizes). Also, as mentioned above, the current mirror matching between currents $MI_0$ and current $I_0$ is also very precise, given the ability to match transistors 102, 104, 106 with one another in the same integrated circuit. Preferably, all of the resistors in resistor chains 94H, 94L have the same size, and thus the same resistance as one another. The range over which limit voltages H_LIM, L_LIM can extend is therefore defined by the resistance of the number of resistors in one of resistor chains 94H, 94L, minus one (at least one resistor remains in series, for the lowest selected voltage). Consider this resistance $R_{90}$ as a multiple J of the resistance of resistor 78:

$$R_{90}=J \cdot R_{78}$$

Therefore, the absolute value of the voltage range $|V_{94}|$ of one of resistor chains 94 is defined as the current through this resistance range:

$$|V_{94}|=R_{94} \cdot MI_0=(J \cdot R_{78}) \cdot MI_0$$

The trimmable reference voltage $V_{RETBIAS}$ is, of course, determined by the product of current $I_0$ with the resistance $R_{78}$ of resistor 78. Accordingly, this arrangement of FIG. 11 permits the setting of a desired voltage range $|V_{94}|$ in relation to the trimmable reference voltage $V_{RETBIAS}$:

$$V_{RETBIAS} = \frac{1}{J \cdot M} \cdot |V_{94}|$$

The parameter J is based on a resistance matching within the same integrated circuit, and the parameter M is based on a current mirror matching within the same integrated circuit. As such, both of these parameters, and thus the relationship between the voltage range $|V_{90}|$ in relation to the trimmable reference voltage $V_{RETBIAS}$, is very precise.

Figure 1:
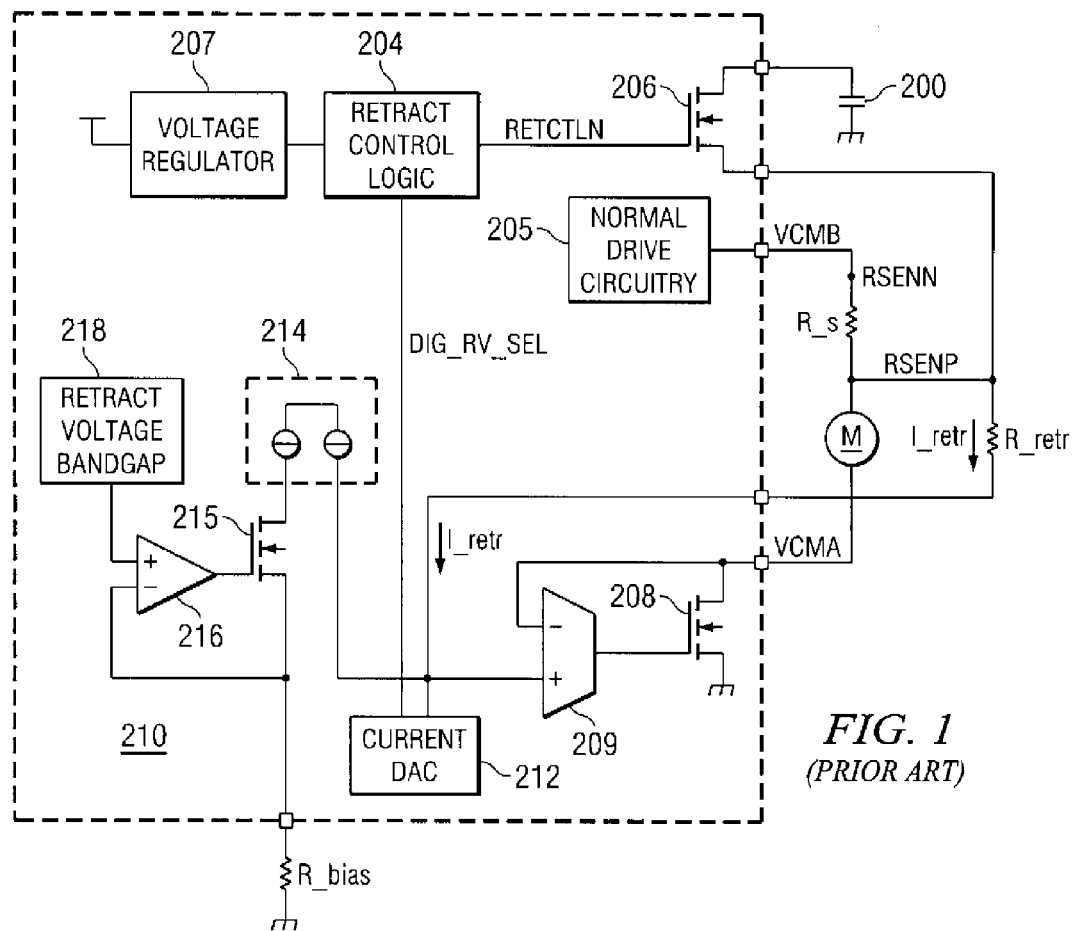
FIG. 1 is an electrical diagram, in block and schematic form, of a conventional voice coil motor retract circuit function.

Current DAC 42', as mentioned above, also includes current mirror transistor 110, which has its gate connected in common with the gates of transistors 102, 104, 106, at the drain of transistor 102. Current mirror transistor 110 is preferably a programmable current mirror leg, for example including multiple transistors connected in parallel that can be switched in or out of the current leg, such that the multiple K of current $I_0$ can be selected in response to a digital control word K_VAL, as shown in FIG. 1. This current $KI_0$ is conducted from node VCMB through variable resistor RETR (the input to low side amplifier 39 being a high impedance input), through current mirror transistor 110. As such, the voltage VRETR is established as:

$$VRETR = RETR \cdot KI_0$$

The resistance of resistor RETR is preferably at some multiple N of the resistance $R_{78}$ of resistor 78. As such, the absolute value of the voltage |VRETR| can be expressed as:

$$|VRETR| = (N \cdot R_{78}) \cdot KI_0$$

Considering that the product of resistance $R_{78}$ and current $I_0$ equals trimmable reference voltage $V_{RETBIAS}$, one can express the voltage VRETR in terms of this reference voltage $V_{RETBIAS}$:

$$V_{RETBIAS} = \frac{1}{N \cdot K} \cdot |VRETR|$$

The parameter K is based on current mirror matching, and the parameter N is based on resistance matching. As such, the voltage VRETR can be established with a high degree of precision, based on trimmable reference voltage $V_{RETBIAS}$, considering that the current mirror and resistor elements are all formed in the same integrated circuit.

Figure 12:
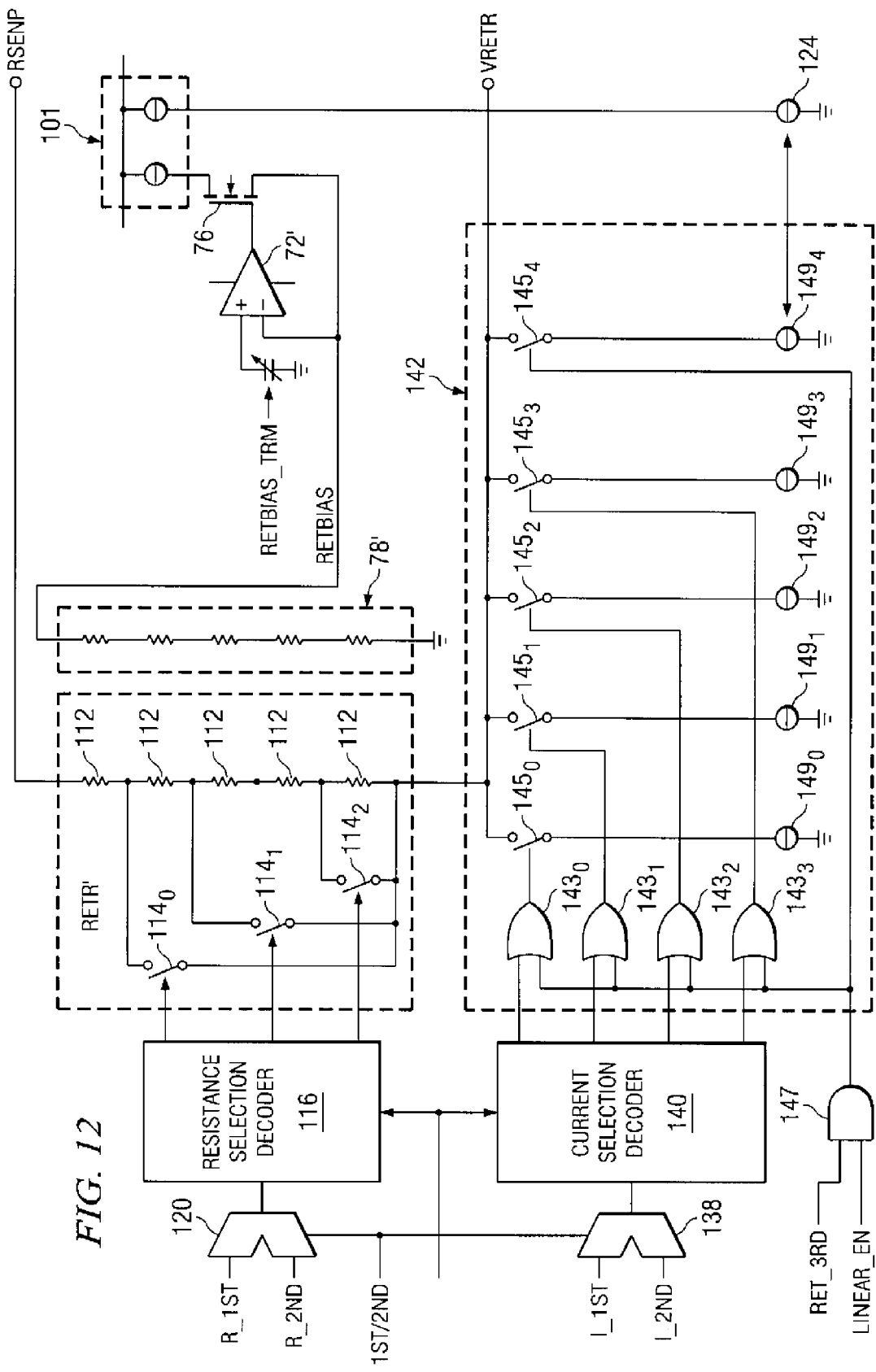
FIG. 12 is an electrical diagram, in block and schematic form, of variable resistance and current DAC circuitry according to an alternative implementation of the preferred embodiment of the invention.

Referring now to FIG. 12, another implementation of variable resistor RETR, in combination with a current DAC for controllably setting the current conducted by variable resistor RETR, will now be described in detail. Those elements shown in FIG. 12 that are the same as those shown in previous Figures will be referred to by the same reference numerals. In this implementation, amplifier 72' receives trim voltage signal RETBIAS_TRM from an EEPROM setting in firmware 23 at its non-inverting input, and has its output controlling the gate of transistor 76 as before. Current defined by current mirror 101, based on the reference current established by current source 124, is conducted through transistor 76 and through resistor chain 78' to ground. The node at the source of transistor 76, which is fed back to the inverting input of amplifier 72', establishes the reference voltage RETBIAS, as before, which is controlled by amplifier 72' to correspond to the voltage corresponding to trim signal RETBIAS_TRM.

Variable resistor RETR' in this implementation includes a series connection of resistors 112 that each have the same resistance as one of the resistors in resistor chain 78', and that number the same as the number of resistors in resistor chain 78' (in this example, numbering five). These resistors 112 are connected in series between another leg in current source 124, and node VRETR, which is connected to ground through current DAC 142. Switches $114_0$ through $114_2$ bypass four, three, and one of resistors 112 in variable resistor RETR', respectively, under the control of signals from resistance selection decoder 116. Decoder 116 receives a digital value from multiplexer 120, which at its inputs receive resistance value signals R_1ST, R_2ND for the two linear retract stages, respectively, as selected in time by control signal 1ST/2ND. According to this implementation, resistance value signals R_1ST, R_2ND are each two-bit values, for example issued by control register 27, so that four possible resistance values (one resistor 112, two resistors 112, four resistors 112, or all five resistors 112) can be selected in each stage. Because the number and individual sizes of resistors 112 in variable resistor RETR' match the number and individual sizes of the resistors in reference resistor chain 78', and because these resistors are formed in the same integrated circuit, the resistors closely match one another. As a result, precise control of these voltages can be attained according to this implementation, as described above.

Current DAC 142 in this example includes current sources $149_0$ through $149_4$, each of which mirrors the current conducted by current source 148 to conduct a current that is a defined multiple of that reference current through current source 124. Each current source $149_0$ through $149_4$ is connected between ground and a corresponding switch $145_0$ through $145_4$, which selectably connects its corresponding current source 149 to node VRETR in response to a control signal. Switches $145_0$ through $145_3$ are controlled by a control signal from an associated OR gate $143_0$ through $143_4$, respectively, while switch $145_4$ is controlled by a control signal from AND gate 147. OR gates 143 each receive a corresponding control signal from current selection decoder 140, in response to one of input digital values I_1ST, I_2ND as selected by multiplexer 138 in response to stage selection signal 1ST, 2ND. Each of OR gates 143 also receive, at an input, the output of AND gate 147, which receives control signals RET_3RD (indicating the third retract stage) and LINEAR_EN at its inputs. Preferably, each of current sources 149 conduct the same current (e.g., 0.5 µA), in which case the available current levels conducted by current DAC 142 in the first and second retract stages range from the maximum current (e.g., 2.0 µA) to one-fourth of that level (e.g., 0.5 µA), with steps at one-half and three-fourths of the full level. In the third retract stage, in which all switches 145 are closed, the maximum current of 2.5 µA is conducted by current DAC 142.

In operation, controller 13 provides multiplexer 138 with the desired current values for the first and second retract stages, in the form of digital values I_1ST, I_2ND, respectively. In the first and second retract stages, control signal RET_3RD is held low by controller 13 via control register 27, and as such each of OR gates $143_0$ through $143_3$ will respond to the selected digital value, as decoded by decoder 140. Accordingly, in the first retract stage, multiplexer 138 will select control value I_1ST for decoding by decoder 140, responsive to which a combination of switches $145_0$ through $145_3$ will be closed and the selected current conducted from variable resistor RETR' to ground. In the second retract stage, the control value I_2ND will be decoded by decoder 140, and the corresponding pattern of switches 145 will be closed for this stage. If a third retract stage is executed, control line RET_3RD will be driven high which, in combination with enabling of the linear control mode (LINEAR_EN high), will force all switches 145 closed, so that the highest value of current conducted by current DAC 142 will be used in that stage.

According to this implementation, therefore, current mirror matching between current source 124 and the current conducted by current sources 149 is provided, which ensures precise setting of the desired control voltage VRETR, especially with the resistor matching used to define the resistance of variable resistor RETR'. In addition, the arrangement of current DAC 142 in this implementation allows for easy digital control of both the resistance of resistor RETR' and the current conducted by current DAC 142, so that the constant voltage to which voice coil motor 12 is to be controlled during retract can readily be optimized, without requiring selecting and hard-wiring external components as in the conventional retract circuitry.

According to this preferred embodiment of the invention, therefore, a high level of precision can be attained in both the linear and PWM control of the retract operation, in a disk drive system. In addition, this precise control is also quite flexible, considering that the reference voltages and currents, as well as the relationship among the various control voltages, are selectable on-chip. For example, the reference voltage and current trimming parameters can be stored as firmware within the voice coil motor control function integrated circuit, or can be digitally controlled along with other parameters such as timing and voltage levels for the retract operation, by way of digital control words from the controller or other programmable logic within the disk drive system. Accordingly, this invention provides a high degree of precise control of the actuator retract function, at reduced cost in both chip area and pin count due to the integration of resistors and other devices into the voice coil motor control integrated circuit.

While the present invention has been described according to its preferred embodiments, it is of course contemplated that modifications of, and alternatives to, these embodiments, such modifications and alternatives obtaining the advantages and benefits of this invention, will be apparent to those of ordinary skill in the art having reference to this specification and its drawings. It is contemplated that such modifications and alternatives are within the scope of this invention as subsequently claimed herein.

What is claimed is:

1. In an integrated circuit, retract circuitry for controlling application of power from a capacitor to a voice coil motor in a disk drive, comprising:
    a retract transistor, having a control terminal and having a conduction path for coupling between the capacitor and a first side of the voice coil motor; and;
    drive circuitry coupled to the control terminal of the retract transistor, for turning on the retract transistor in a retract stage;
    a low side transistor, having a conduction path for coupling between a second side of the voice coil motor and a ground voltage, and having a control terminal;
    a low side amplifier, having an output coupled to the conduction path of the low side transistor, and having first and second inputs, the first input for coupling to the second side of the voice coil motor;
    a resistor in the integrated circuit, for coupling between the first side of the voice coil motor and the second input of the low side amplifier; and
    a current control circuit, coupled to the second input of the low side amplifier, for conducting a selected current, wherein the current control circuit is operative even after loss of a main power supply.

2. The circuitry of claim 1, further comprising:
    a low side gate drive circuit, for presenting a turn on voltage;
    a switch for coupling the gate of the low side transistor to a selected one of the output of the low side amplifier and the low side gate drive circuit, selected responsive to a control signal.

3. The circuitry of claim 1, wherein the current control circuit comprises a current digital-to-analog converter, for conducting a current corresponding to a digital signal value.

4. The circuitry of claim 3, further comprising:
    a reference transistor, having a conduction path coupled in series in a first current mirror leg, and having a control terminal;
    a reference resistor, coupled in series with the conduction path of the reference transistor;
    an amplifier, having an output coupled to the control terminal of the reference transistor, and having a first input coupled to receive a trimmable voltage and having a second input coupled to receive a feedback voltage from across the reference resistor;
    wherein the current digital-to-analog converter is connected to in a second current mirror leg, for conducting a current responsive to the current in the first current mirror leg and responsive to the digital control value.

5. The circuitry of claim 4, wherein the current digital-to-analog converter includes a mirror transistor for conducting a current at a multiple of the current conducted in the first current mirror leg, the multiple selected responsive to the digital control value.

6. The circuitry of claim 1, wherein the resistor in the integrated circuit comprises a variable resistor, for exhibiting a resistance of a value selected responsive to a control signal.

7. The circuitry of claim 1, further comprising:
    retract control logic, comprising:
        a control register, for receiving and storing control information; and
        a retract timer and mode control function, for generating control signals in the circuitry responsive to control information stored in the retract control logic.

8. The circuitry of claim 7, wherein the control register stores control information pertaining to the duration of a plurality of retract stages.

9. The circuitry of claim 8, wherein the resistor in the integrated circuit comprises a variable resistor, for exhibiting a resistance of a value selected responsive to a variable resistor control signal;
    wherein the control signals generated by the retract timer and mode control function includes the variable resistor control signal;
    and wherein the variable resistor comprises:
        a plurality of resistors connected in series; and
        a switch selectable closable across at least one of the plurality of resistors;
    wherein in a first one of the plurality of retract stages, the retract timer and mode control function generates a variable resistor control signal that closes the switch in the variable resistor;
    and wherein in a second one of the plurality of retract stages, the retract timer and mode control function generates a variable resistor control signal that opens the switch in the variable resistor.

10. The circuitry of claim 7, wherein the retract control logic further comprises:
    a decoder, coupled to the control register, for generating control signals to the current digital-to-analog converter in the plurality of retract stages.

11. A method of controlling retract power applied to a voice coil motor in a disk drive system, comprising the steps of:
    coupling a capacitor to a first side of a voice coil motor;
    conducting a selected current through a resistor, coupled to the first side of the voice coil motor; and
    controlling a transistor coupled to a second side of the voice coil motor in response to a comparison of a voltage developed across the resistor with a voltage at the second side of the voice coil motor to maintain a controlled voltage across the voice coil motor, even after loss of a main power supply,
    wherein the controlling step comprises:
        applying the voltage developed across the resistor to a first input of a differential amplifier;
        coupling the voltage at the second side of the voice coil motor to a second input of the differential amplifier; and
        applying the output of the differential amplifier to the control terminal of a low side transistor that has its conduction path connected in series between the second side of the voice coil motor and a ground voltage.

12. The method of claim 11, wherein the resistor and the differential amplifier are disposed within the same integrated circuit as one another.

13. A method of controlling retract power applied to a voice coil motor in a disk drive system, comprising the steps of:
    coupling a capacitor to a first side of a voice coil motor;
    conducting a selected current through a resistor coupled to the first side of the voice coil motor;
    controlling a transistor coupled to a second side of the voice coil motor in response to a comparison of a voltage developed across the resistor with a voltage at the second side of the voice coil motor to maintain a controlled voltage across the voice coil motor, even after loss of a main power supply; and
    controlling a current digital-to-analog converter to conduct the selected current responsive to a digital control value.

14. The method of claim 13, wherein the coupling step is performed responsive to a loss of power supply voltage event.

15. The method of claim 13, further comprising:
    controlling the current digital-to-analog converter to conduct a first selected current in a first retract stage, and to conduct a second selected current in a second retract stage.

16. The method of claim 15, wherein the resistor is a variable resistor;
    and further comprising:
        controlling the variable resistor to have a first resistance value during the first retract stage, and to have a second resistance value during the second retract stage.

17. The method of claim 13, wherein the resistor is a variable resistor;
    and further comprising:
        controlling the variable resistor to have a first resistance value during a first retract stage, and to have a second resistance value during a second retract stage.

18. In an integrated circuit, retract circuitry for controlling application of power from a capacitor to a voice coil motor in a disk drive, comprising:
    a retract transistor, having a control terminal and having a conduction path for coupling between the capacitor and a first side of the voice coil motor; and;
    drive circuitry coupled to the control terminal of the retract transistor, for turning on the retract transistor in a retract stage;
    a low side transistor, having a conduction path for coupling between a second side of the voice coil motor and a ground voltage, and having a control terminal;
    a low side amplifier, having an output coupled to the conduction path of the low side transistor, and having first and second inputs, the first input for coupling to the second side of the voice coil motor;
    a variable resistor in the integrated circuit, for coupling between the first side of the voice coil motor and the second input of the low side amplifier and exhibiting a value selected responsive to a control signal; and
    a current control circuit, coupled to the second input of the low side amplifier, for conducting a selected current, wherein the current control circuit is operative even after loss of a main power supply.

19. The circuitry of claim 18, further comprising:
    a low side gate drive circuit, for presenting a turn on voltage;
    a switch for coupling the gate of the low side transistor to a selected one of the output of the low side amplifier and the low side gate drive circuit, selected responsive to a control signal.

* * * * *